(12) United States Patent
Shimizu

(10) Patent No.: US 7,110,053 B2
(45) Date of Patent: Sep. 19, 2006

(54) REFLECTIVE LIQUID CRYSTAL PROJECTION APPARATUS WITH ELLIPTICAL POLARIZATION

(75) Inventor: Shigeo Shimizu, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 27 days.

(21) Appl. No.: 10/358,247

(22) Filed: Feb. 5, 2003

(65) Prior Publication Data

US 2003/0164909 A1    Sep. 4, 2003

(30) Foreign Application Priority Data

Mar. 1, 2002   (JP) ............... 2002-055778
May 21, 2002  (JP) ............... 2002-145871

(51) Int. Cl.
*G02F 1/1335*    (2006.01)

(52) U.S. Cl. ................... 349/9; 349/113; 349/117

(58) Field of Classification Search ............... 349/113, 349/117, 102, 5, 119, 121
See application file for complete search history.

(56) References Cited

U.S. PATENT DOCUMENTS

| | | | |
|---|---|---|---|
| 5,576,854 A | | 11/1996 | Schmidt et al. |
| 6,512,561 B1 * | | 1/2003 | Terashita et al. ............ 349/118 |
| 6,536,903 B1 * | | 3/2003 | Bone ........................... 353/31 |
| 6,624,862 B1 * | | 9/2003 | Hayashi et al. ............. 349/119 |
| 6,833,894 B1 * | | 12/2004 | Gandhi et al. .............. 349/117 |
| 6,982,772 B1 * | | 1/2006 | Shikita et al. .............. 349/117 |
| 2003/0128320 A1 | | 7/2003 | Mi et al. |
| 2005/0078238 A1 * | | 4/2005 | Okamoto et al. ............ 349/98 |

FOREIGN PATENT DOCUMENTS

| | | |
|---|---|---|
| JP | 11-242221 | 9/1999 |
| JP | 2000-199883 | 7/2000 |
| JP | 2001-051270 | 2/2001 |

* cited by examiner

*Primary Examiner*—Andrew Schechter
*Assistant Examiner*—Richard Kim
(74) *Attorney, Agent, or Firm*—Connolly Bove Lodge & Hutz LLP

(57) ABSTRACT

A reflective liquid crystal projection apparatus 14 is composed of a light source 2, a polarizing plate 16A for incident light, a reflective liquid crystal element 8, another polarizing plate 16B for reflected light that is disposed in the cross Nicol relation with the polarizing plate 16A and a phase difference compensating plate 18 disposed between the reflective liquid crystal element 8 and the other polarizing plate 16B. The reflective liquid crystal projection apparatus 14 projects a picture image formed in the reflective liquid crystal element 8 on a screen 12 through a projection lens 10. The phase difference compensating plate 18 has no anisotropy in a plane parallel direction and a larger refractive index in the plane parallel direction than another refractive index in the thickness direction, and is disposed with being slightly tilted with respect to the reflective liquid crystal element 8. Accordingly, a picture image high in brightness and high in black and white contrast ratio can be projected on the screen 12.

6 Claims, 18 Drawing Sheets

REFLECTIVE LIQUID CRYSTAL PROJECTION APPARATUS WITH ELLIPTICAL POLARIZATION

BACKGROUND OF THE INVENTION

1 Field of the Invention

The present invention is related to a reflective liquid crystal projection apparatus.

2. Description of the Related Arts

FIG. 22 is one example of a configuration of reflective liquid crystal projection apparatus according to the prior art.

Generally, a reflective liquid crystal projection apparatus 1 (hereinafter referred to as reflective LCD projector 1) having a configuration shown in FIG. 22 is commonly known. As shown in FIG. 22, the reflective LCD projector 1 is composed of a light source 2 such as a lamp, a collimating lens 4 that collimates light emitted from the light source 2, a polarizing beam splitter 6, a reflective liquid crystal element 8 (hereinafter referred to as reflective LCD 8) that modulates polarized light in response to a picture signal S1 that is supplied to the reflective LCD 8, a projection lens 10 and a screen 12. The light, which is reflected by the reflective LCD 8 and passes through the polarizing beam splitter 6, is projected on the screen 12 by the projection lens 10.

In the reflective LCD projector 1, the light emitted from the light source 2 is collimated to be parallel approximately by the collimating lens 4 and converted into linear polarized light by the polarizing beam splitter 6, and then irradiated on the reflective LCD 8. In the reflective LCD 8, the light is modulated by the picture signal S1 and reflected. The reflected light is incident to the polarizing beam splitter 6 again, and a particular component of the reflected light is separated, and then the separated light is projected on the screen 12 through the projection lens 10. Consequently, a picture image is projected on the screen 12. Since the light that shuttles between the polarizing beam splitter 6 and the reflective LCD 8 passes through the same optical path, such a light source system of the reflective LCD projector 1 is termed as an ON-AXIS optical system.

In the case of such an ON-AXIS optical system, as long as the polarizing beam splitter is used, there existed a phenomenon such that a polarization condition for skew light is apt to be changed due to the characteristic of the polarizing beam splitter. Consequently, there existed a problem such that leaked light caused by the above-mentioned phenomenon makes it difficult to display black state excellently.

In order to solve the problem mentioned above, it is commonly practiced that inserting a ¼ wavelength ($\lambda$) plate (hereinafter referred to as $\lambda/4$ plate) into the light path between the polarizing beam splitter 6 and the reflective LCD 8 compensates a black level and obtains an excellent black state.

This kind of projection apparatus is apt to use the projection lens 10 having a larger NA (numerical aperture) so as to display a brighter picture image on the screen 12. Although increasing an NA reduces an F number and enables to make a projected picture image brighter, however, there existed another problem such that increasing the NA increases light loss in the polarizing beam splitter 6 and results in that the projected picture image is not so bright as expected.

Further, if the NA is increased, light that passes through the liquid crystal layer of the reflective LCD 8 obliquely is also used for projecting a picture image on the screen 12, and resulted in a problem of deteriorating black-and-white contrast ratio.

In addition thereto, it is strictly required for the optimum angle of the $\lambda/4$ plate to be adjusted precisely. Consequently, delicate angle adjustment as many as the order of 0.1 degree, for example, is necessary, and resulted in creating another problem that the angle adjustment becomes harder.

SUMMARY OF THE INVENTION

Accordingly, in consideration of the above-mentioned problems of the prior art, an object of the present invention is to provide a reflective liquid crystal projection apparatus, which can project a brighter picture image and display the picture image in high black-and-white contrast ratio.

In order to achieve the above object, the present invention provides, according to an aspect thereof, a reflective liquid crystal projection apparatus comprising: a light source; a means for polarizing incident light and for making first polarized light out of light emitted from the light source pass through; a reflective liquid crystal element optically modulating the first polarized light passed through the means for polarizing incident light into second polarized light and reflecting the second polarized light; a means for polarizing reflected light and for making the second polarized light reflected by the reflective liquid crystal element pass through; and a phase difference compensating plate disposed between the reflective liquid crystal element and the means for polarizing incident light and reflected light in a light path of the light emitted from the light source, the reflective liquid crystal projection apparatus projecting a picture image formed in the reflective liquid crystal element by the second polarized light passing through the means for polarizing reflected light, and the reflective liquid crystal projection apparatus is further characterized in that the phase difference compensating plate has no anisotropy in a plane parallel direction and has a refractive index in the plane parallel direction larger than another refractive index in the thickness direction, and is disposed with being slightly tilted with respect to the reflective liquid crystal element.

According to another aspect of the present invention, there provided a reflective liquid crystal projection apparatus comprising: a light source; a means for polarizing incident light and for making first polarized light out of light emitted from the light source pass through; a reflective liquid crystal element optically modulating the first polarized light passed through the means for polarizing incident light into second polarized light and reflecting the second polarized light; a means for polarizing reflected light and for making the second polarized light reflected by the reflective liquid crystal element pass through; and a phase difference compensating plate disposed between the reflective liquid crystal element and the means for polarizing incident light and reflected light in a light path of the light emitted from the light source, the reflective liquid crystal projection apparatus projecting a picture image formed in the reflective liquid crystal element by the second polarized light passing through the means for polarizing reflected light, and the reflective liquid crystal projection apparatus is further characterized in that the phase difference compensating plate has a refractive index difference, which generates a phase difference larger than another phase difference generated by an applied voltage that is used for displaying black state, in a plane parallel direction and a phase difference in the plane parallel direction larger than another refractive index in the thickness direction.

According to further aspect of the present invention, there provided a reflective liquid crystal projection apparatus comprising: a light source; a means for polarizing incident light and for making first polarized light out of light emitted from the light source pass through; a reflective liquid crystal element optically modulating the first polarized light passed through the means for polarizing incident light into second polarized light and reflecting the second polarized light; a means for polarizing reflected light and for making the second polarized light reflected by the reflective liquid crystal element pass through; and a phase difference compensating plate disposed between the reflective liquid crystal element and the means for polarizing incident light and reflected light in a light path of the light emitted from the light source, the reflective liquid crystal projection apparatus projecting a picture image formed in the reflective liquid crystal element by the second polarized light passing through the means for polarizing reflected light, and the reflective liquid crystal projection apparatus is further characterized in that the phase difference compensating plate conducts the circular polarization or the elliptical polarization, and a phase difference of the phase difference compensating plate is within a range of more than a phase difference generated in the reflective liquid crystal element and less than $\lambda/4$, wherein $\lambda$ is a center wavelength of the light incident into the phase difference compensating plate.

Other object and further features of the present invention will be apparent from the following detailed description when read in conjunction with the accompanying drawings.

DETAILED DESCRIPTION OF THE PREFERRED EMBODIMENTS

In the preferred embodiments of the present invention, a particular case that uses a polarizing plate as a device for polarizing incident light or reflected light is explained.

[First Embodiment]

Figure 1:
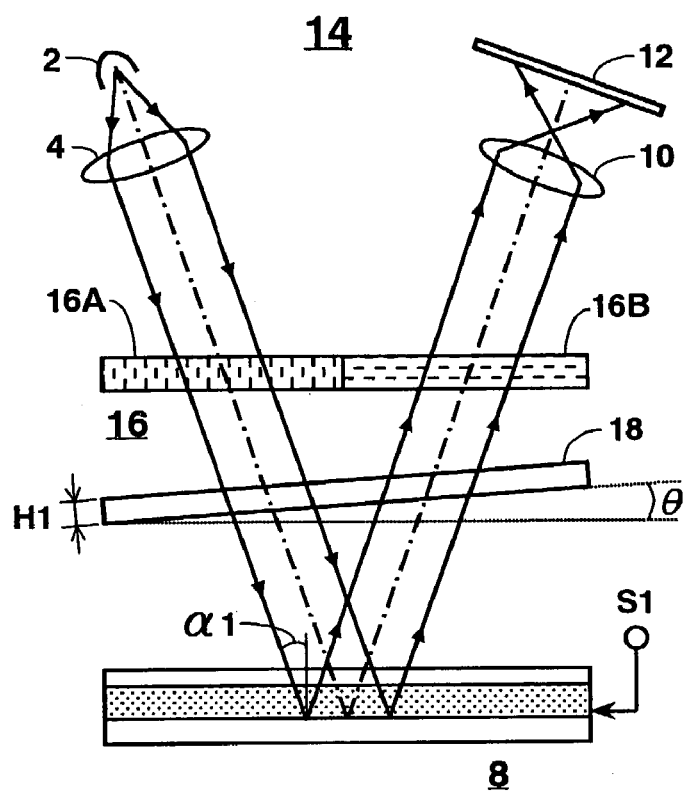
FIG. 1 is a first basic configuration of a reflective liquid crystal projection apparatus according to a first embodiment of the present invention.

FIG. 1 is a first basic configuration of a reflective liquid crystal projection apparatus according to a first embodiment of the present invention.

Figure 2:
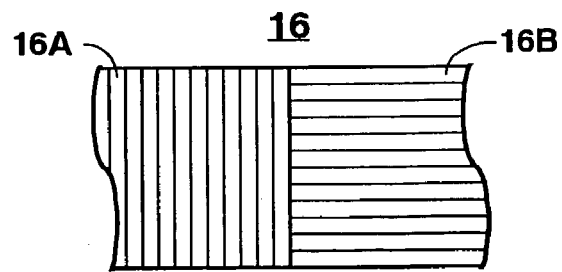
FIG. 2 is a plan view of a first phase difference compensating plate of the reflective liquid crystal projection apparatus shown in FIG. 1.

FIG. 2 is a plan view of a first phase difference compensating plate of the reflective liquid crystal projection apparatus shown in FIG. 1.

Figure 3:
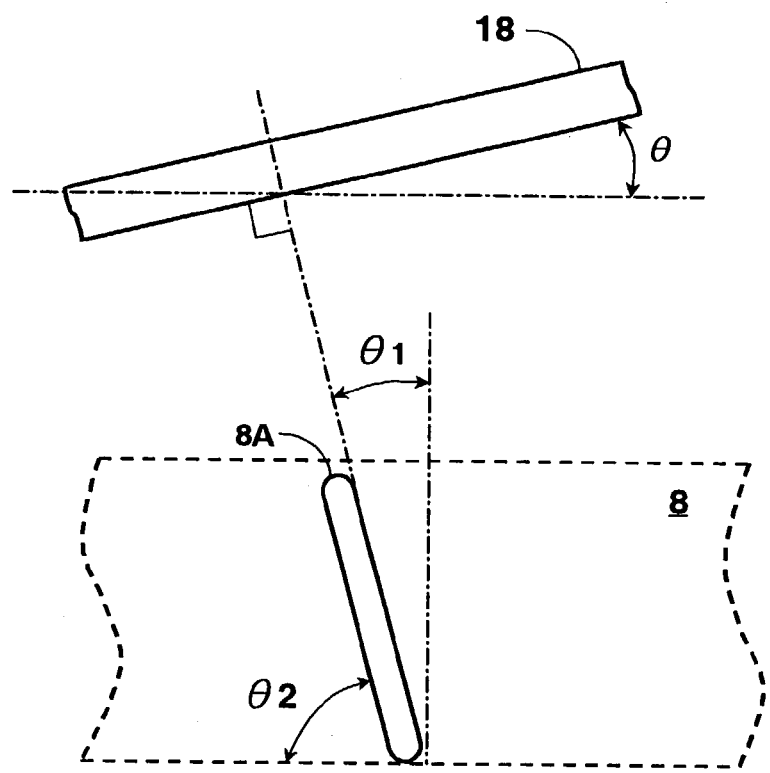
FIG. 3 shows a relationship between a disposing direction of the first phase difference compensating plate shown in FIG. 1 and a direction of liquid crystal molecule.

FIG. 3 shows a relationship between a disposing direction of the first phase difference compensating plate shown in FIG. 1 and a direction of liquid crystal molecule.

Figure 4:
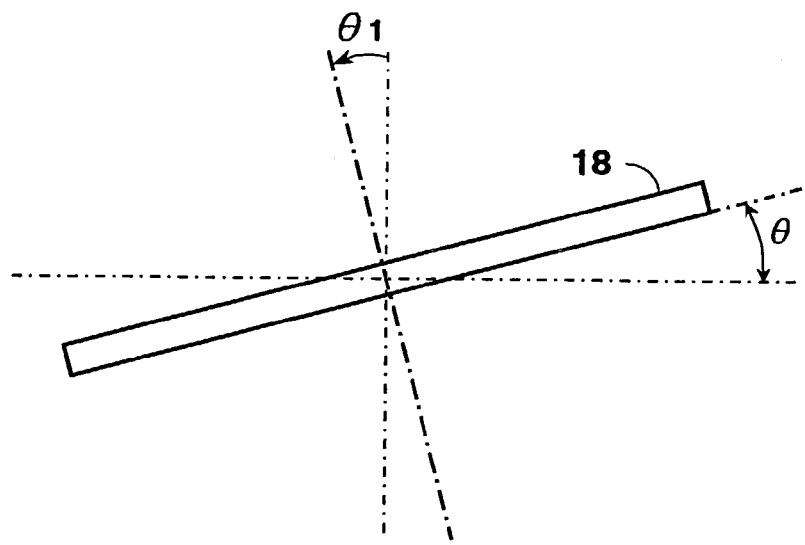
FIG. 4 is an explanatory drawing for explaining a slanted state of the first phase difference compensating plate shown in FIG. 1.

FIG. 4 is an explanatory drawing for explaining a slanted state of the first phase difference compensating plate shown in FIG. 1.

Figure 5A:
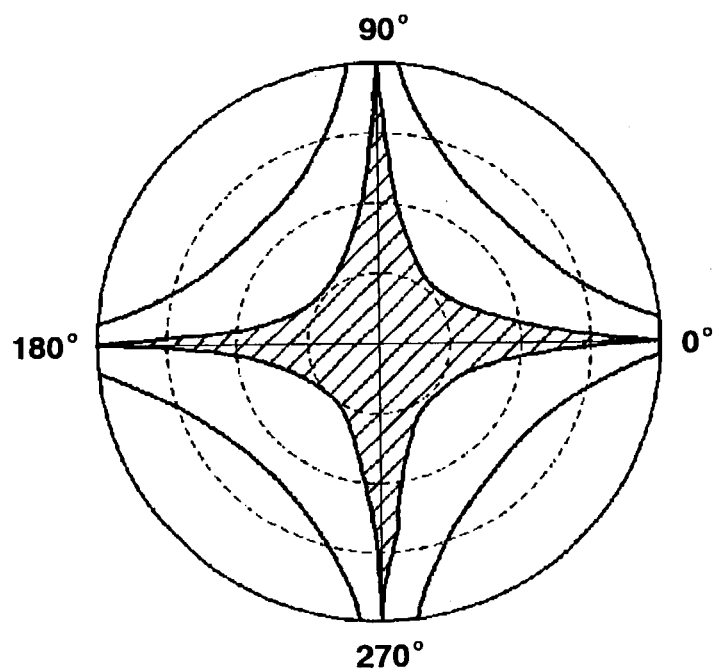
FIGS. 5(a) and 5(b) are graphs showing a viewing angle characteristic in the black state when no voltage is applied across the liquid crystal in the basic configuration shown in FIG. 1.
Figure 5B:
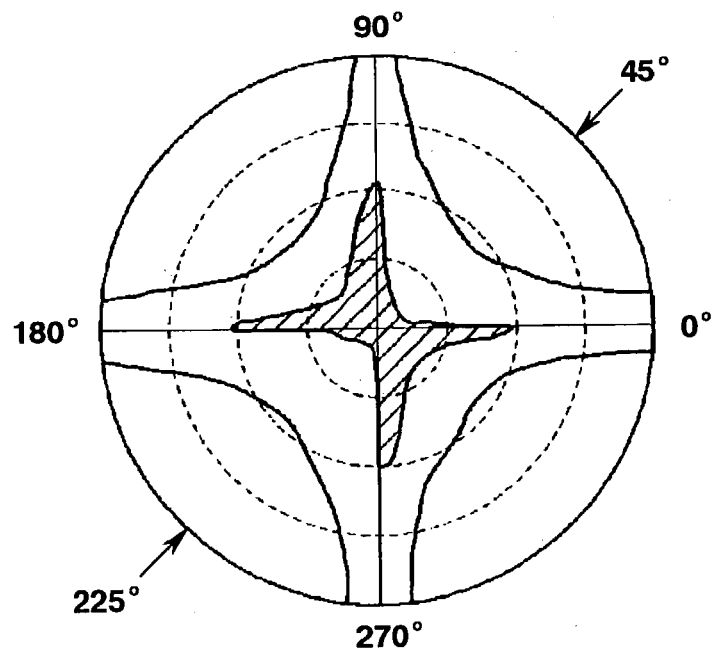

FIGS. 5(a) and 5(b) are graphs showing a viewing angle characteristic in the black state when no voltage is applied across the liquid crystal in the basic configuration shown in FIG. 1.

A major feature of the first embodiment is that a so-called OFF-AXIS optical system in which a light path toward a liquid crystal element differs from a light path from the liquid crystal element is adopted without using a polarizing beam splitter.

Further, a flat compensating plate having a lower refractive index in an axial direction such as discotic liquid crystal in which discotic liquid crystal molecules are piled up and form a columnar shape is used for optically compensating distortion caused by the liquid crystal element because a liquid crystal molecule has a larger refractive index in a major axis direction.

Furthermore, in order to compensate affection caused by a tilted liquid crystal molecule completely, the compensating plate is inserted into an optical system with tilting the compensating plate slightly. Consequently, ideal optical compensation can be realized.

As shown in FIG. 1, a reflective liquid crystal projection apparatus 14 (hereinafter referred to as reflective LCD projector 14) is composed of a light source 2 such as a lamp, a collimating lens 4 that collimates light emitted from the light source 2, a polarizing plate unit 16, a reflective liquid crystal element 8 (hereinafter referred to as reflective LCD 8) in which a direction of liquid crystal corresponding to a plurality of pixels is controlled by a picture signal S1 supplied to the reflective LCD 8, a projection lens 10, a screen 12, and a first phase difference compensating plate 18 having a thickness of H1, wherein the first phase difference compensating plate 18 is the major feature of the present invention. Light, which is reflected by the reflective LCD 8 and passes through the first phase difference compensating plate 18 and the polarizing plate unit 16, is projected on the screen 12 by the projection lens 10. In this first embodiment, a LCD (liquid crystal display) such that liquid crystal molecules are disposed vertically is used for the reflective LCD 8.

Actually, the reflective LCD projector 14 has a structure of the OFF-AXIS optical system, so that incident light is irradiated on the reflective LCD 8 from a direction inclined a predetermined angle α1 (hereinafter referred to as incident angle α1) with respect to the vertical direction of the reflective LCD 8. Consequently, a light path of the incident light and another light path of reflected light is intended to be different from each other. In addition, the incident angle α1 is within a range of 2 degrees to 45 degrees.

As shown in FIGS. 1 and 2, the polarizing plate unit 16 is composed of a plate 16A for polarizing incident light (hereinafter referred to as polarizing plate 16A), wherein incident light toward the reflective LCD 8 passes through the polarizing plate 16A, and another plate 16B for polarizing reflected light (hereinafter referred to as polarizing plate 16B), wherein light reflected by the reflective LCD 8 passes through the polarizing plate 16B. Optical characteristics of the polarizing plates 16A and 16B are intended to be different from each other. The polarizing plate 16A is designed to pass S polarized light only, for example. On the contrary, the other polarizing plate 16B is designed to pass P polarized light only. The polarizing plates 16A and 16B can be designed to invert it function of passing the S polarized light or the P polarized light.

Further, the polarizing plate unit 16 is disposed in parallel to the reflective LCD 8.

Furthermore, it should be understood that the polarizing plates 16A and 16B of the polarizing plate unit 16 could be disposed separately.

Moreover, the first phase difference compensating plate 18 is disposed within a light path between the polarizing plate unit 16 and the reflective LCD 8 with inclined an angle θ (hereinafter referred to as tilt angle θ) slightly with respect to the horizontal direction of the reflective LCD 8. The first phase difference compensating plate 18 is not anisotropic in a plane parallel direction, and a refractive index in the depth direction is set to be smaller than that in the plane parallel direction. In other words, a refractive index N of the first phase difference compensating plate 18 is designed to be equal to any directions in the plane parallel direction.

In addition, the refractive index N is designed to be larger than another refractive index Nz in the depth direction, that is, N>Nz.

A discotic liquid crystal and a TAC (triacetyl cellulose) film can be used for the first phase difference compensating plate 18.

The thickness H1 of the first phase difference compensating plate 18 is determined by a following equation.

$$H1 = \Delta n \times d / (N - Nz), \text{ where}$$

Δn is a refractive index difference between the major axis and the minor axis with respect to a liquid crystal in the reflective LCD 8, and "d" is a thickness of a liquid crystal cell in the reflective LCD 8.

In a case that a refractive index difference Δn between the major axis direction and the minor axis direction of liquid crystal is 0.083, a thickness "d" of a liquid crystal cell is 3.2 μm, a refractive index N in the plane parallel directions of the first phase difference compensating plate 18 is 1.52250 and a refractive index Nz in the depth direction of the first phase difference compensating plate 18 is 1.51586, for example, a thickness H1 of the first phase difference compensating plate 18 becomes 40 μm approximately.

In this first embodiment, the first phase difference compensating plate 18 of which the thickness H1 is set to be 40 μm is used.

Further, in this case, a liquid crystal molecule 8A of the reflective LCD 8 is disposed with being inclined a slight angle θ1 with respect to the vertical direction of the reflective LCD 8 as shown in FIG. 3.

Furthermore, the first phase difference compensating plate 18 is disposed so as to be perpendicular to the tilted direction of the liquid crystal molecule 8A as shown in FIGS. 3 and 4, wherein an angle θ2 that is an interior angle between the liquid crystal molecule 8A and the horizontal direction of the reflective LCD 8 is defined as a pre-tilt angle θ2. Consequently, in a case that the pre-tilt angle θ2 is set to be 85 degrees approximately, that is, the angle θ1 is approximately 5 degrees, the tilt angle θ of the first phase difference compensating plate 18 is set to be 5 degrees approximately.

When a picture image is actually displayed by using the reflective LCD projector 14 constituted as mentioned above, it is confirmed that a phase difference is compensated ideally, a viewing angle characteristic is expanded more widely, and black-and-white contrast ratio is increased. In other words, according to this embodiment, black-and-white contrast ratio can be increased extremely as well as enabling to use a projection lens having a smaller F-number and to project a brighter picture image.

A viewing angle characteristic and displaying black-and-white level is examined. Therefore, a result of examination is explained next.

A basic optical system used for the examination is equivalent to the optical system shown in FIG. 1. Light emitted by the light source 2 passes through the first phase difference compensating plate 18 by way of the polarizing plate 16A for incident light and incident into the reflective LCD 8. The incident light into the reflective LCD 8 is optically modulated and reflected. The reflected light passes through the first phase difference compensating plate 18 once again and optically detected by the other polarizing plate 16B for reflected light that is disposed in the cross Nicol arrangement. By using a photo sensor not shown, light passing through the other polarizing plate 16B is monitored. An incident direction of light is changed without changing locations of the reflective LCD 8 and the first phase difference compensating plate 18 or an azimuth of polarization. With respect to an incident direction of the reflective LCD 8, there is existed a hemispherical observing direction of 90 degrees in the polar angle direction and 360 degrees in the azimuth direction. Characteristics observed from such a hemispherical observing direction are shown in FIGS. 5(a) and 5(b). In FIGS. 5(a) and 5(b), a characteristic, which is observed when a polar angle, that is, the incident angle α1 in FIG. 1, is changed, is exhibited by a radius position. In the graphs shown in FIGS. 5(a) and 5(b), four coaxial circles correspond to 20, 40, 60 and 80 degrees of the incident angle α1 respectively in accordance with circles from the innermost circle to the outermost circle. Figures 0°, 90°, 180°, and 270°, allocated along the outermost circle are azimuth angles.

FIG. 5(a) shows brightness while displaying black state by using the reflective LCD projector 14 according to the first embodiment of the present invention. In a viewing angle characteristic as shown in FIG. 5(a), brightness is exhibited by contour lines and an area in which a black level having sufficient contrast ratio such as a contrast ratio of 400:1 can be obtained is indicated by slanted lines. The black level decreases, that is, brightness becomes darker in accordance with approaching the center of the graph. On the contrary, the black level increases and brightness becomes brighter in accordance with approaching the outermost circumference of the graph. The situation is the same as for a viewing angle characteristic to be mentioned hereinafter.

It is apparent from the graph shown in FIG. 5(a) that the shaded area in which a black level is practical level is relatively wide.

Further, it is found that a wide viewing angle characteristic can be obtained without showing a tendency of brightness that increases rapidly in a particular direction.

On the other hand, FIG. 5(b) shows brightness when the first phase difference compensating plate 18 is not used. In this case, a shaded area having a practical black level is narrowed at azimuth angles of 45 degrees and 225 degrees in comparison with that shown in FIG. 5(a). If these azimuth angles are adopted, total contrast ratio of a projected picture image is deteriorated and results in generating uneven contrast in the projected picture image. Consequently, a usable range of incident angle is extremely restricted.

Figure 22:
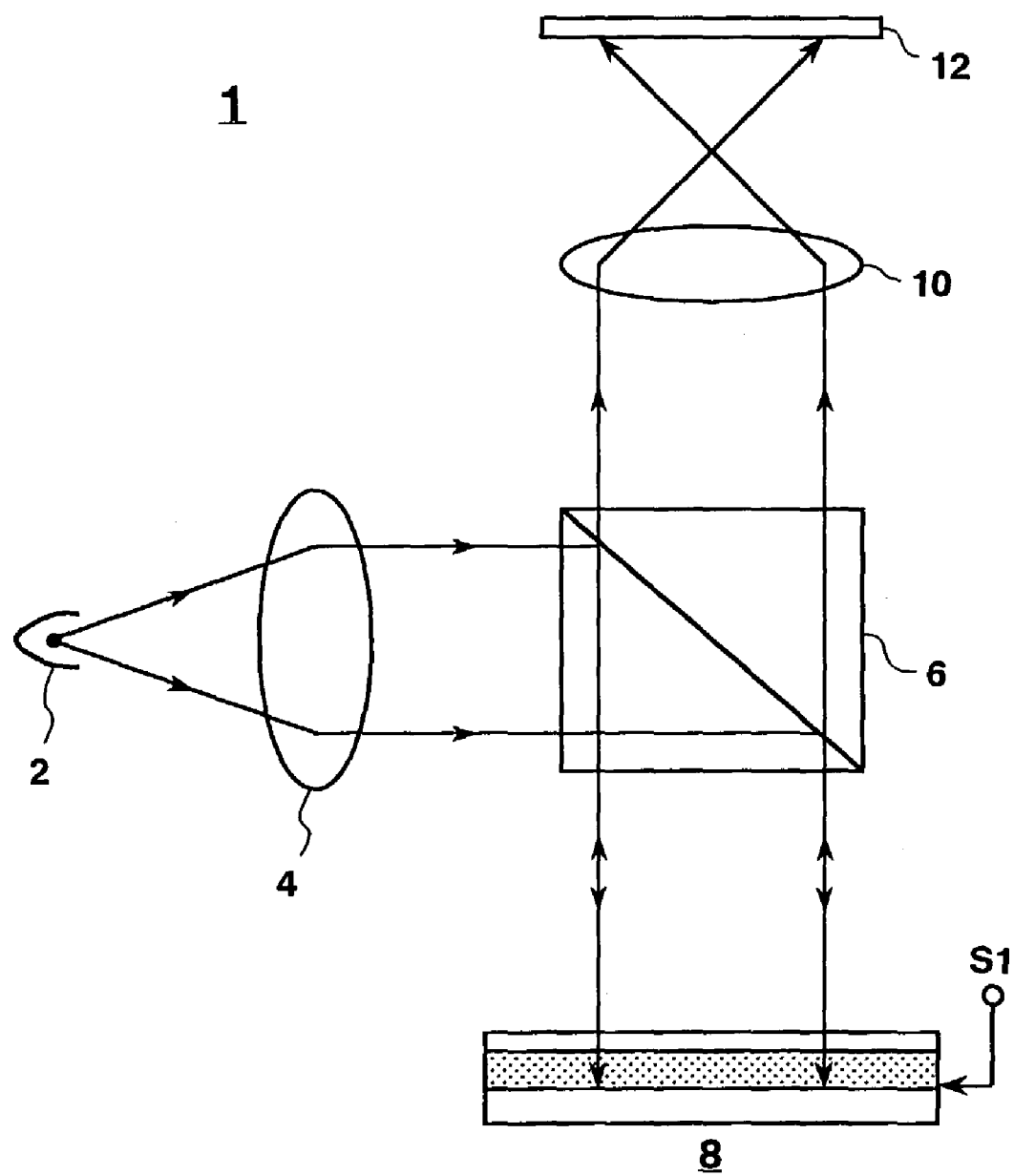
FIG. 22 is one example of a configuration of reflective liquid crystal projection apparatus according to the prior art.

In addition thereto, in the case of the ON-AXIS optical system using the polarizing beam splitter 6 such as shown in FIG. 22, if the first phase difference compensating plate 18 is inserted into the light path between the polarizing beam splitter 6 and the reflective LCD 8, light that penetrates into the polarizing beam splitter 6 with being tilted is modulated and reflected by the reflective LCD 8. When the reflected light penetrates into the polarizing beam splitter 6 again, the reflected light passes through the polarized beam splitter 6 otherwise a characteristic of the first phase difference compensating plate 18 to be inserted is λ/4. Accordingly, using the first phase difference compensating plate 18 so as to compensate optically is not effective for the ON-AXIS optical system.

[Second Embodiment]

A major feature of a second embodiment is that a phase difference compensating plate, which has a phase difference in the horizontal direction or a plane parallel direction larger than another phase difference that is generated in a liquid crystal by a certain voltage used for displaying black state.

Further, a refractive index in a thickness direction of the phase difference compensating plate is smaller than another refractive index in the plane parallel direction is inserted between a liquid crystal element and a polarizing plate so as to pass incident light and reflected light.

In the above-mentioned case, a position of rotational direction of the phase difference compensating plate is set so as to be an optimal direction that is automatically decided by a polarizing direction of incident light into the phase difference compensating plate and a orientation direction of a liquid crystal molecule in the phase difference compensating plate.

Figure 6:
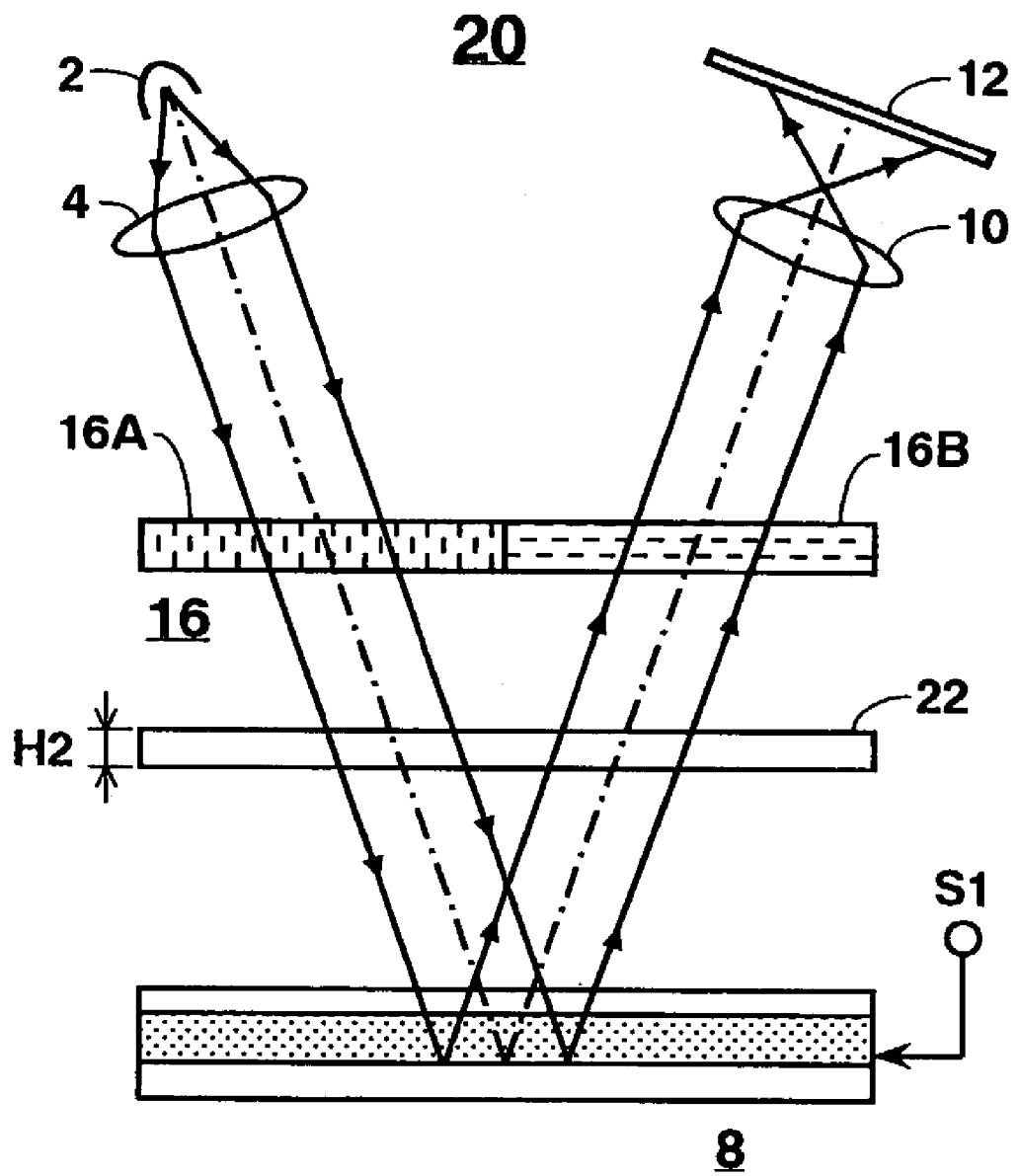
FIG. 6 is a second basic configuration of a reflective liquid crystal projection apparatus according to a second embodiment of the present invention.

FIG. 6 is a second basic configuration of a reflective liquid crystal projection apparatus according to a second embodiment of the present invention.

Figure 7B:
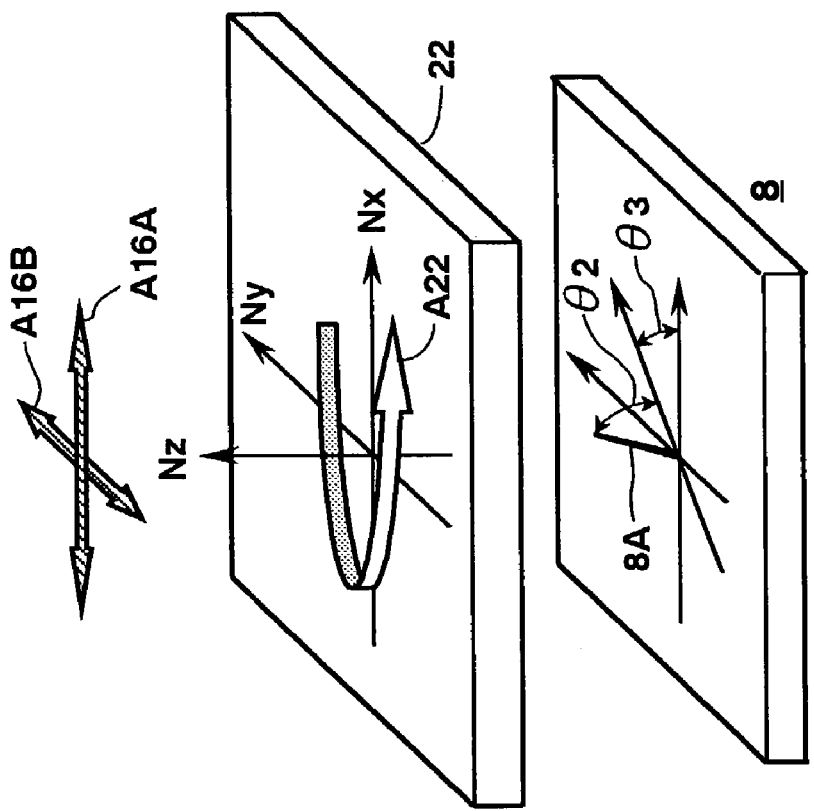
FIG. 7(b) shows a relation between polarization and the relative disposition of each component shown in FIG. 7(a).
Figure 7A:
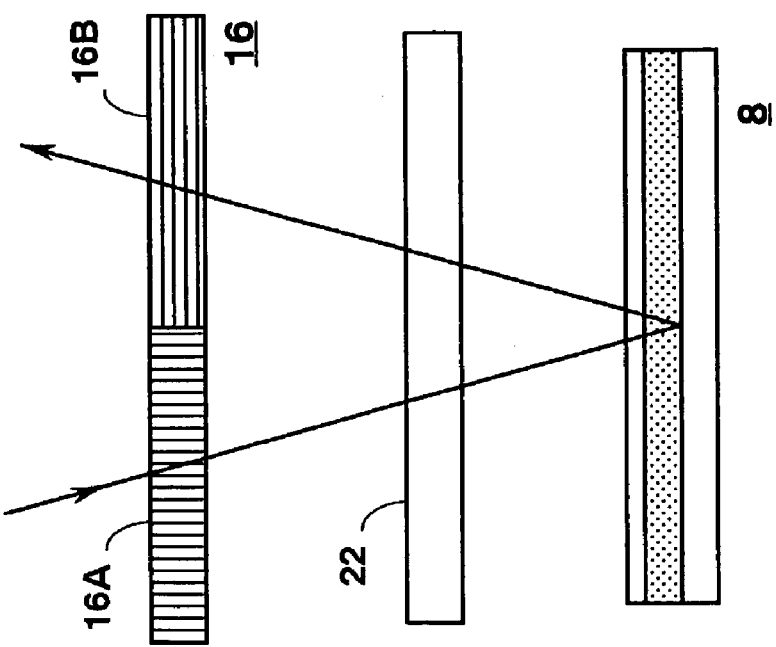
FIG. 7(a) shows a relative disposition of each component of the reflective liquid crystal projection apparatus shown in FIG. 6.

FIG. 7(a) shows a relative disposition of each component of the reflective liquid crystal projection apparatus shown in FIG. 6.

FIG. 7(b) shows a relation between polarization and the relative disposition of each component shown in FIG. 7(a).

Figure 8:
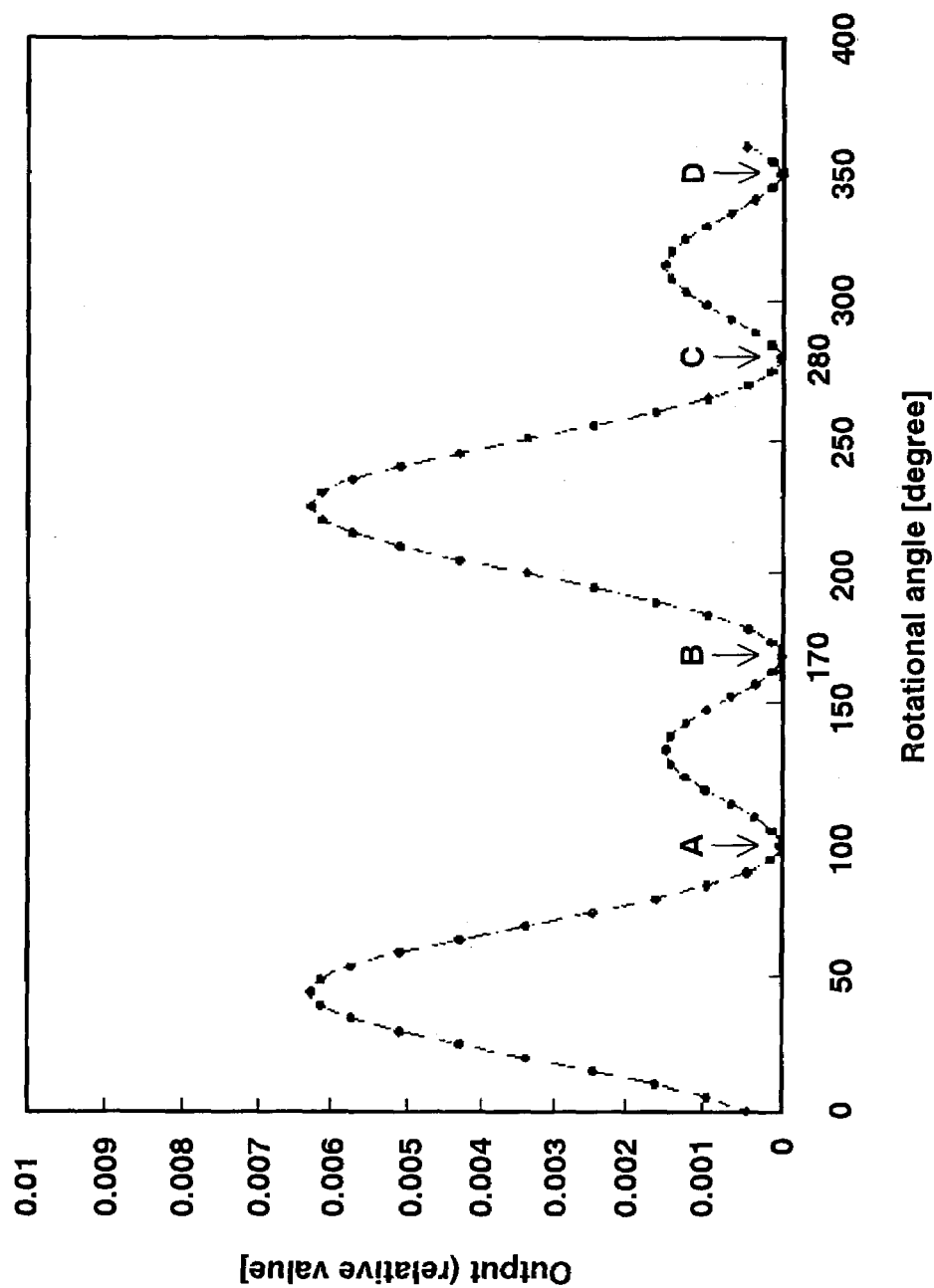
FIG. 8 is a graph showing a change of intensity of light (brightness) passing through the second phase difference compensating plate while the second phase difference compensating plate is rotated horizontally in one full turn.

FIG. 8 is a graph showing a change of intensity of light (brightness) passing through the second phase difference compensating plate while the second phase difference compensating plate is rotated horizontally in one full turn.

Figure 9:
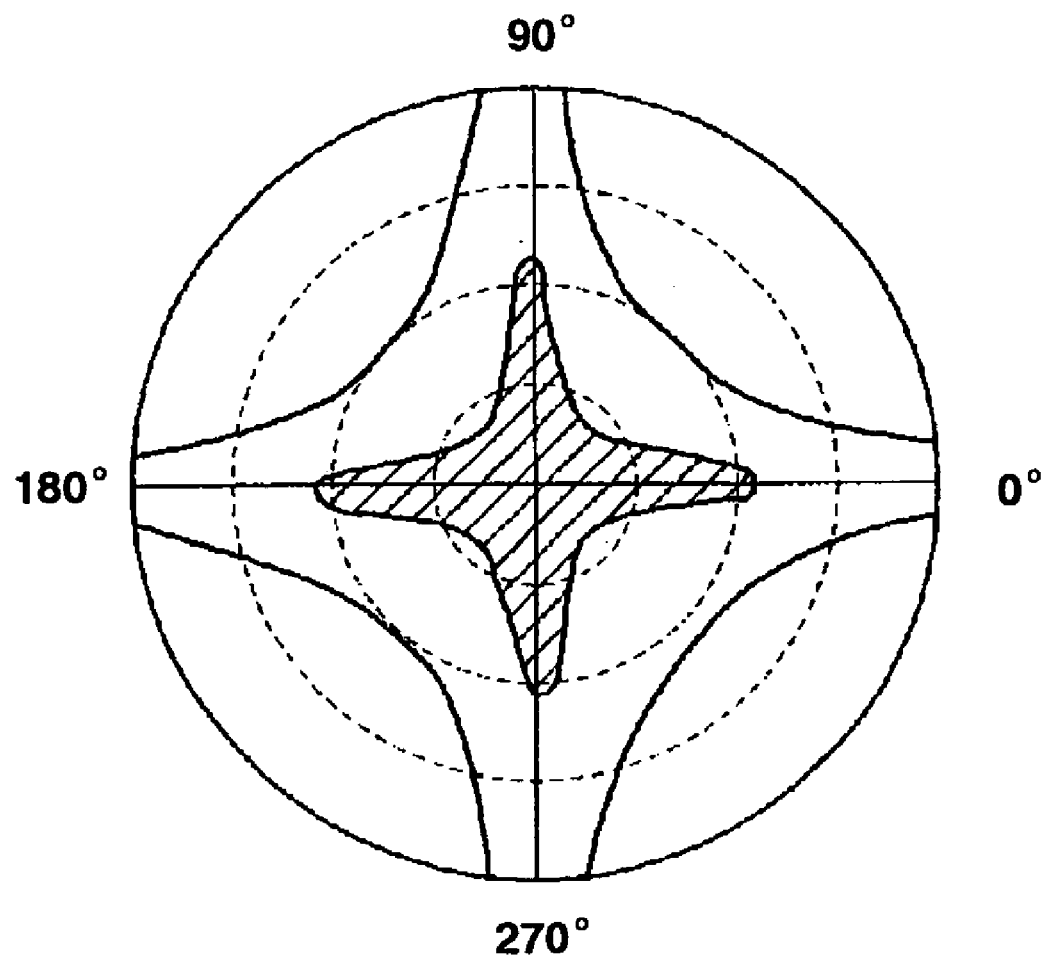
FIG. 9 is a graph showing a change of black level that is measured by changing an incident angle of light in the optical system of the reflective liquid crystal projection apparatus shown in FIG. 6.

FIG. 9 is a graph showing a change of black level that is measured by changing an incident angle of light in the optical system of the reflective liquid crystal projection apparatus shown in FIG. 6.

Figure 10:
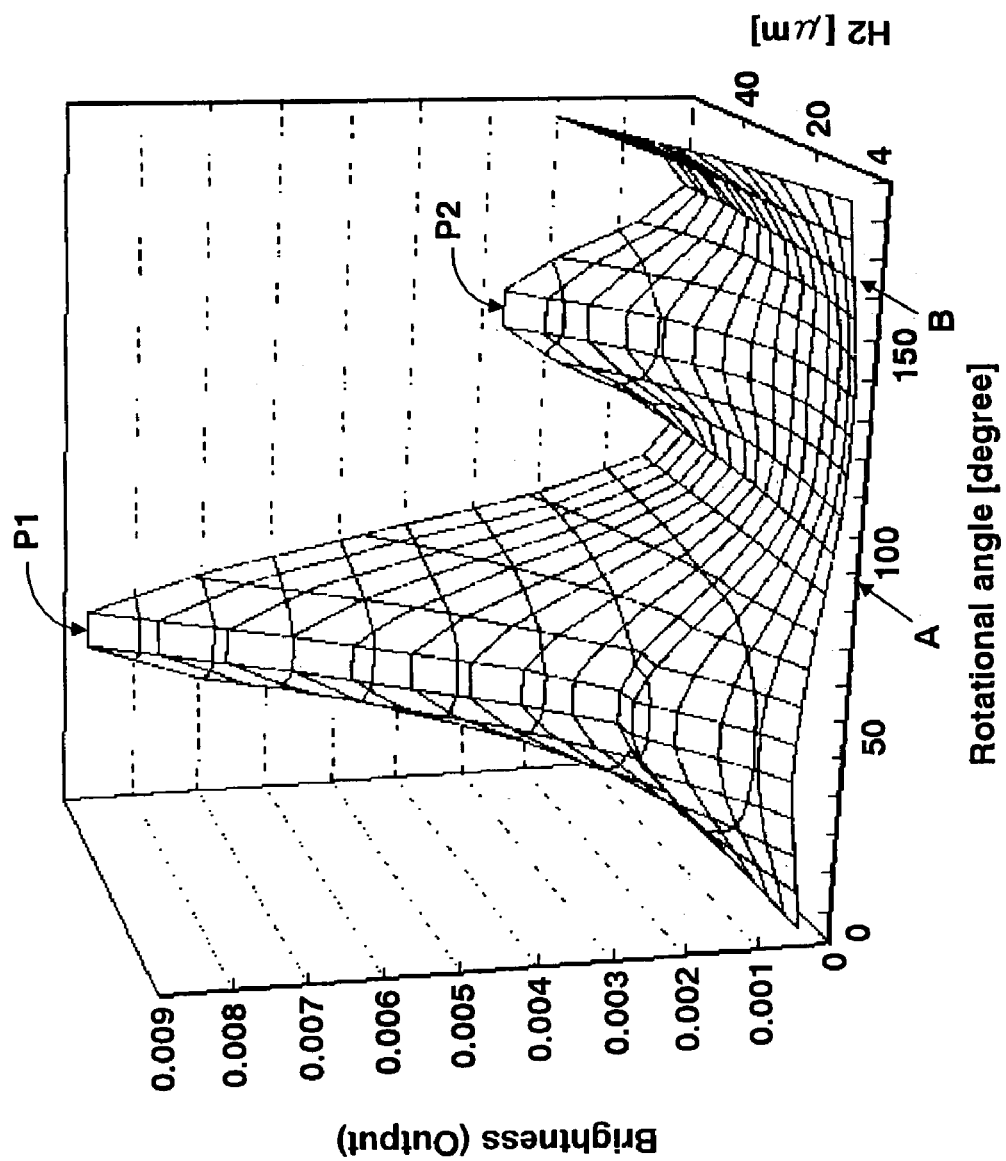
FIG. 10 is a graph showing a relationship among a rotational angle, a plate thickness of the second phase difference compensating plate and brightness three-dimensionally.

FIG. 10 is a graph showing a relationship among a rotational angle, a plate thickness of the second phase difference compensating plate and brightness three-dimensionally.

Figure 11:
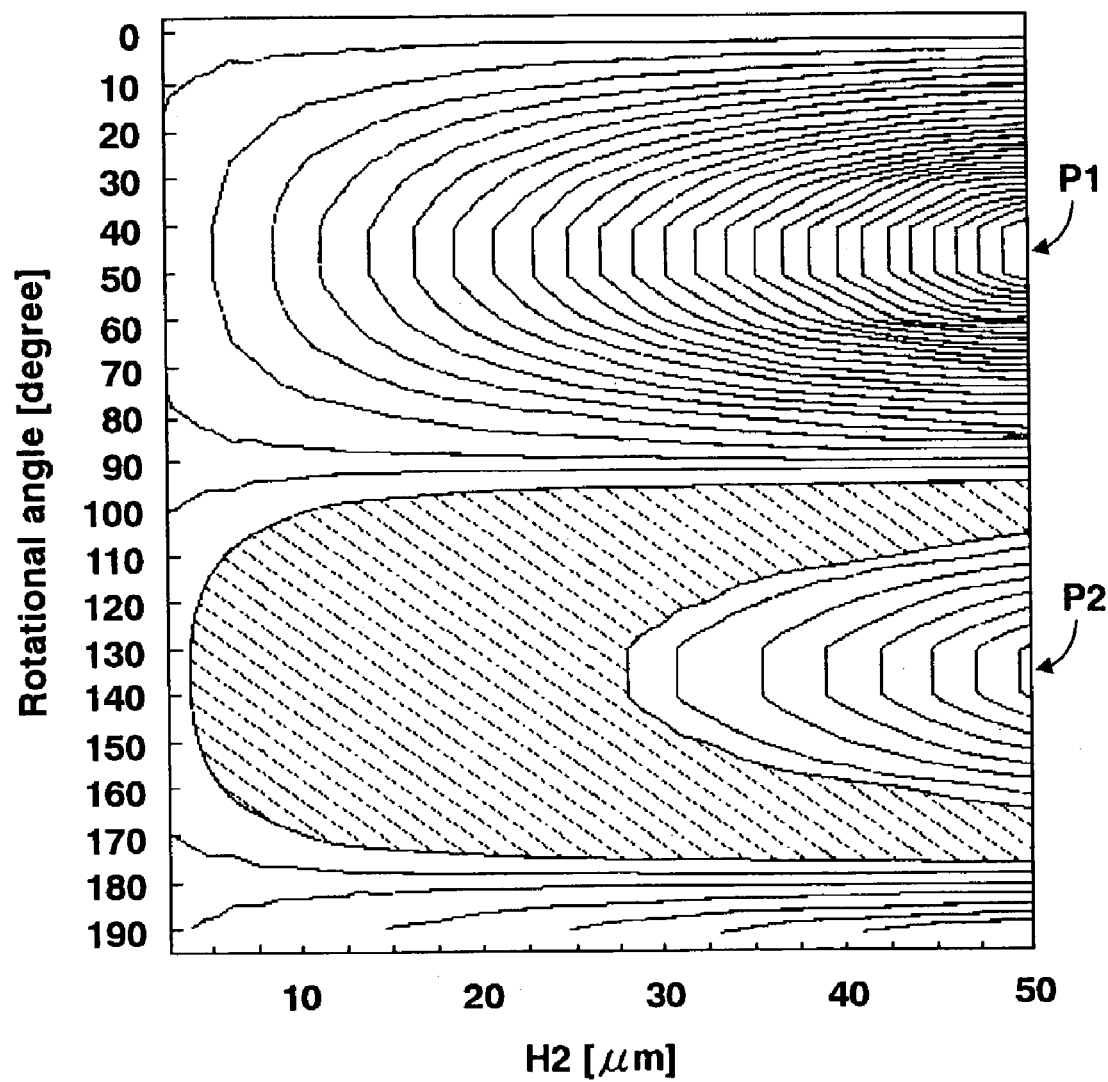
FIG. 11 is a graph exhibiting the three-dimensional graph shown in FIG. 10 in plane by a contour line.

FIG. 11 is a graph exhibiting the three-dimensional graph shown in FIG. 10 in plane by a contour line.

Figure 12:
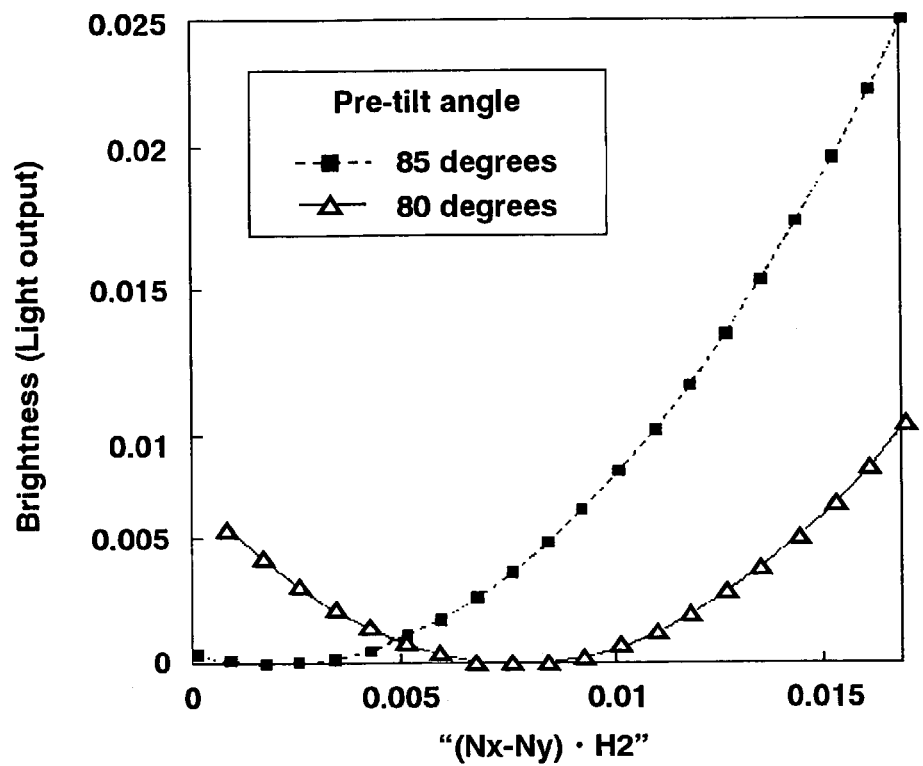
FIG. 12 is a graph showing a relationship between a parameter "(Nx−Nz)·H2" in the horizontal direction and brightness.

FIG. 12 is a graph showing a relationship between a parameter "(Nx−Nz)·H2" in the horizontal direction and brightness.

Figure 13:
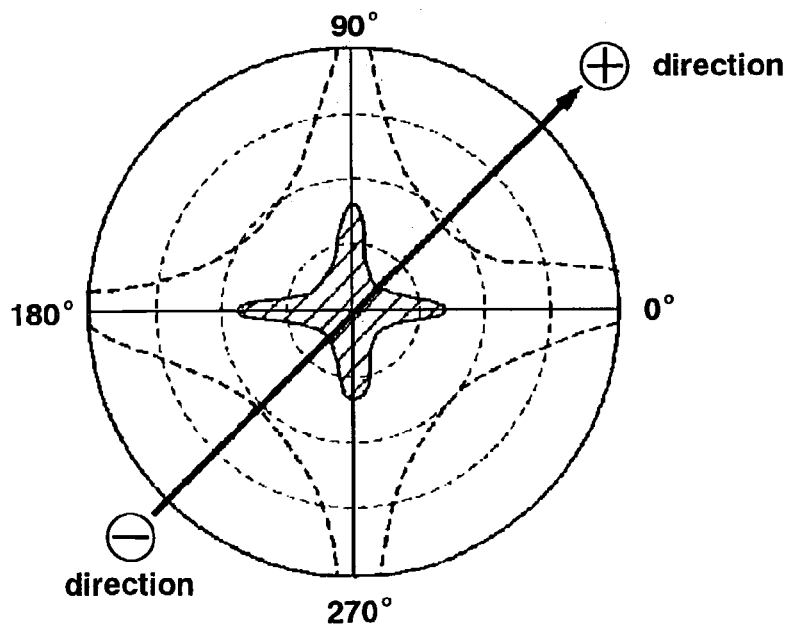
FIG. 13 is a graph showing one example of a light leaking state that happens in accordance with a direction of incident light when the light is incident into the reflective liquid crystal element in the dark state when a pre-tilt angle of the liquid crystal is 80 degrees.

FIG. 13 is a graph showing one example of a light leaking state that happens in accordance with a direction of incident light when the light is incident into the reflective liquid crystal element in the dark state when a pre-tilt angle of the liquid crystal is 80 degrees.

Figure 14:
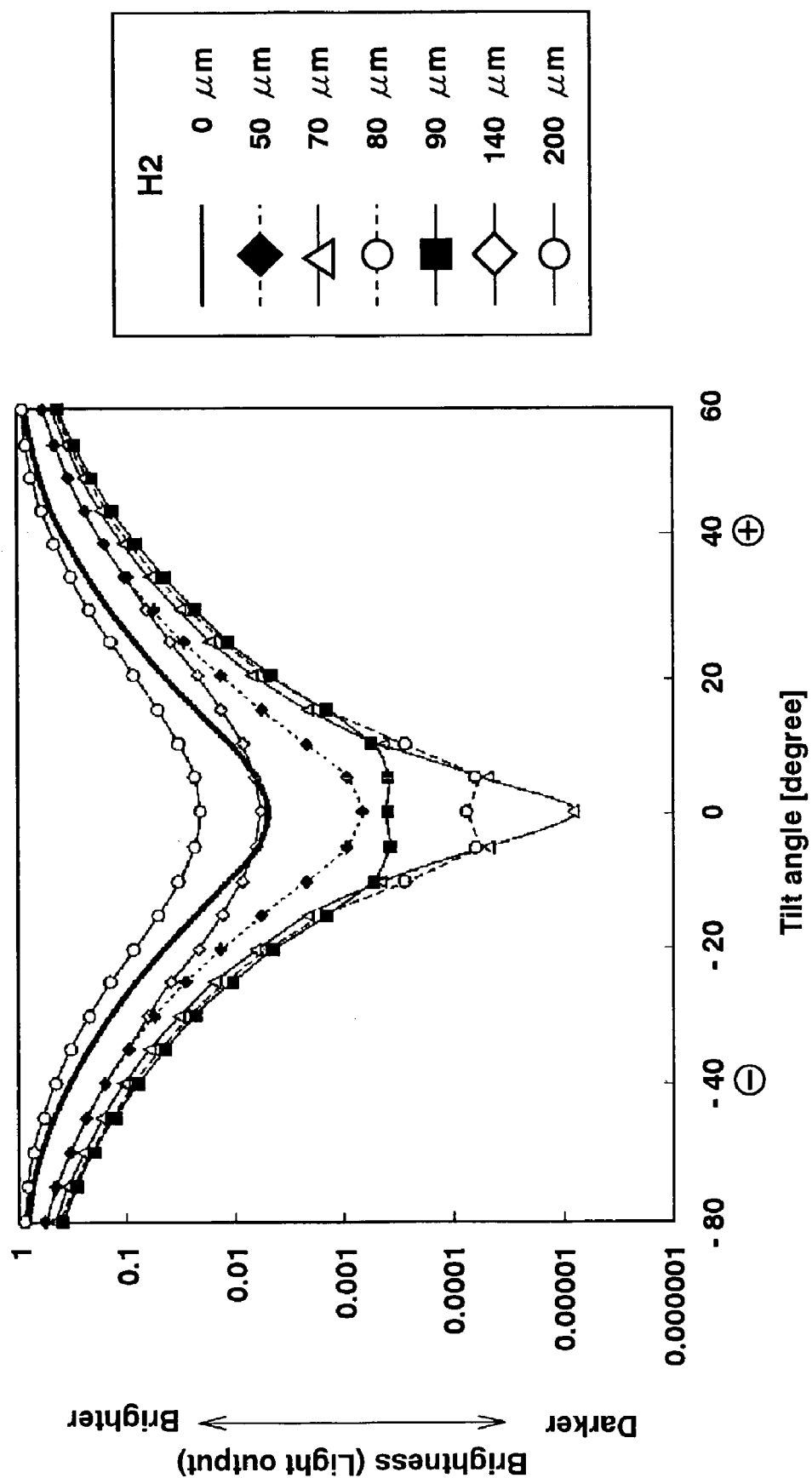
FIG. 14 is a graph of cross section that is cut along the arrow direction shown in FIG. 13 showing a relationship between brightness and a rotational angle of the second phase difference compensating plate.

FIG. 14 is a graph of cross section that is cut along the arrow direction shown in FIG. 13 showing a relationship between brightness and a rotational angle of the second phase difference compensating plate.

In FIG. 6, a reflective liquid crystal projection apparatus 20 (hereinafter referred to as reflective-LCD projector 20) is identical to the reflective LCD projector 14 shown in FIG. 1 except for a second phase difference compensating plate 22 having a thickness of H2. Therefore, details of the same functions and operations as the reflective LCD projector 14 are omitted. As shown in FIG. 6, the second phase difference compensating plate 22 is disposed in parallel to the polarizing plate unit 16 and the reflective LCD 8 without being tilted. In this case, the second phase difference compensating plate 22 is different from the first phase difference compensating plate 18 in an optical characteristic such that the second phase difference compensating plate 22 has a refractive index difference in the plane parallel direction, which generates a phase difference larger than another phase difference generated by an applied voltage that is used for displaying black state, and a refractive index in a thickness direction is smaller than another refractive index in the plane parallel direction.

In FIG. 7(b), a liquid crystal molecule 8A is twisted in the plane of the second phase difference compensating plate 22 by an angle of θ3 (hereinafter referred to as a pre-twist angle θ3) with respect to the x-axis of the reflective LCD 8, and the liquid crystal molecule 8A is tilted by a pre-tilt angle θ2.

Further, in FIG. 7(b), an arrow A22 is a rotational direction of the second phase difference compensating plate 22, an arrow A16A is a polarizing direction of incident light by the polarizing plate 16A and an arrow A16B is a detecting direction of reflected light by the polarizing plate 16B.

As shown in FIG. 7(b), a refractive index varies by a direction in the plane of the second phase difference compensating plate 22. For example, in the plane of the second phase difference compensating plate 22, if a first refractive index in a particular direction that conducts a largest refractive index is defined as Nx, a second refractive index in a plane parallel direction that intersects perpendicularly to the particular direction is defined as Ny, and a third refractive index in the thickness direction, that is, the vertical direction of the second phase difference compensating plate 22 is defined as Nz, there existed a relationship among the first to third refractive indexes Nx, Ny and Nz as shown below.

Nx>Ny>Nz

The thickness H2 of the second phase differences compensating plate 22 is set as follows:

First of all, it is less effective that a phase difference between a refractive index difference (Nx−Ny) in the plane parallel direction of the second phase difference compensating plate 22 and a parameter in the horizontal direction obtained by multiplying the thickness H2 of the second phase difference compensating plate 22, that is, "(Nx−Ny)·H2" is smaller than another phase difference caused by a liquid crystal in a liquid crystal cell that inclines from the vertical direction. Consequently, the phase difference is desirable to be larger than the other phase difference.

Secondarily, the parameter "(Nx−Ny)·H2" in the horizontal direction of the second phase difference compensating plate 22 is desirable to be smaller than "Δn·d", wherein "Δn" is a refractive index difference between a major axis direction and a minor axis direction of a liquid crystal in the reflective LCD 8, and the "d" is a thickness of the liquid crystal cell of the reflective LCD 8.

By assigning the thickness H2 of the second phase difference compensating plate 22 to the above-mentioned conditions and by rotating the second phase difference compensating plate 22 to the arrow direction A22 shown in FIG. 7(b), a condition such as lesser light leakage in the dark state and high in contrast ratio can be obtained. The refractive index Nz in the thickness direction of the second phase difference compensating plate 22 is defined by the condition as follows:

Increasing gradually a parameter "(Nx−Nz)·H2" in the vertical direction of the second phase difference compensating plate 22 increases a range of incident angle in which predetermined contrast ratio can be obtained. However, increasing the parameter "(Nx−Ny)·H2" excessively deteriorates contrast ratio, on the contrary. It is desirable for the parameter "(Nx−Nz)·H2" that a maximal range of incident angle can be obtained by the value out of values satisfying the conditions of contrast ratio.

In a case that the film VA-110 (registered trademark) manufactured by Sumitomo Chemical Industry Co., Ltd., for example, is used for the second phase difference compensating plate 22, a particular case that the thickness H2 of the second phase difference compensating plate 22 is 46 μm, wherein Nx is 1.50085, Ny is 1.50073 and Nz is 1.49832, for example, is explained next.

Further, "Δn" and "d" is the same value as those of the first embodiment, that is, 0.083 and 3.2 μm respectively.

Furthermore, the second phase difference compensating plate 22 is rotated with pivoting its center as a shaft of rotation in the plane, and then the second phase difference compensating plate 22 is fixed at an optimal rotational position. The optimal rotational position depends on the polarizing direction A16A of incident light into the second phase difference compensating plate 22 and an orientation direction of liquid crystal molecule, so that this process of rotating the second phase difference compensating plate 22 for an optimal rotational position is conducted. In this case, there existed four optimal directions or optimal rotational positions (will be explained later)

Moreover, the pre-twist angle θ3 of the liquid crystal molecule 8A of the reflective LCD 8 is 45 degrees and the pre-tilt angle θ2 is 85 degrees. In addition, an incident direction of polarized light (a direction of oscillatory surface of light) into the reflective LCD 8 is zero degree.

In the reflective LCD projector 20 constituted as mentioned above, when monochromatic light of green (G) having a wavelength of 550 nm is perpendicularly incident into the reflective LCD 8 that is supplied with no voltage, a contrast ratio is 2300:1. Consequently, excellent contrast ratio can be obtained.

While the second phase difference compensating plate 22 is rotated on its center axis as a shaft of rotation fully in the plane parallel direction, an appearing state of black level (displaying black state) is explained next, wherein a driving voltage for the reflective LCD 8 is zero volt. As shown in FIG. 8, an output becomes zero at four points A, B, C and D and results in displaying complete black state while the second phase difference compensating plate 22 is rotated fully one turn. Therefore, it is apparent that a rotational position of the second phase difference compensating plate 22 shall be fixed to any one point of the four points A, B, C and D for optimal contrast ratio. Consequently, contrast of black and white can be set maximally. In addition, the four points A, B, C and D are allocated in positions being symmetric with respect to the center of rotation of the second phase difference compensating plate 22.

In a case that the rotational position of the second phase difference compensating plate 22 is set to the point "A", a contrast ratio is increased to more than 10000:1 when G (green) monochromatic light having the wavelength of 550 nm is incident perpendicularly to the reflective LCD 8.

Further, a characteristic of viewing angle characteristic is excellent and resulted in expanding the viewing angle characteristic. This is caused by enabling to compensate light optically even though the light is incident from an inclined direction.

Furthermore, brightness is hardly reduced even in a state of rotating the second phase difference compensating plate 22.

A viewing angle characteristic and displaying a level of black and white is examined hereupon. Results of the evaluation are explained next.

A method of the examination is the same as that of the first embodiment and each state of black level is monitored. A graph indicating intensity of the black level when monitored is shown in FIG. 9. In a case that an incident angle α1 is set to be 20, 40, 60 and 80 degrees respectively, four coaxial circles shown in FIG. 9 correspond to 20, 40, 60 and 80 degrees of the incident angle α1 respectively in accordance with circles from the innermost circle to the outermost circle. Figures 0°, 90°, 180°, and 270°, allocated along the outermost circle are azimuth angles.

It is apparent from the graph shown in FIG. 9 that a shaded area in which a black level is a practical level is relatively wide.

Further, it is found that a wide viewing angle characteristic can be obtained without showing a tendency of brightness that increases rapidly in a particular direction.

Furthermore, in a case of the second embodiment, it is allowed for the second phase difference compensating plate 22 that accuracy of a rotational position is not strict, so that tolerance becomes larger. Consequently, the second phase difference compensating plate 22 can be adhered on the surface of the reflective LCD 8 or on the surface of a dichroic prism in a case of displaying in color.

In this case, a mechanism for adjusting rotation of the second phase difference compensating plate 22 is not necessary and resulted in reducing costs for materials and manufacturing the mechanism.

Further, a space for installing the mechanism is not necessary. Therefore, a distance between the dichroic prism and the reflective LCD 8 can be shortened and resulted in creating a margin for back focus of the projection lens 10. Consequently, a short distance projection can be realized.

In addition thereto, enabling to shorten the back focus makes designing of a projection lens easier. A projection lens that is low in cost can be used.

The major point explained with referring to FIG. 8 is further detailed next. As mentioned above, one of parameters that optimize contrast ratio is the refractive index difference "(Nx−Ny)" in the plane parallel direction of the second phase difference compensating plate 22 or the thickness H2 of the second phase difference compensating plate 22. By rotating the second phase difference compensating plate 22, contrast ratio can be optimized.

Further, a relationship among light leakage or brightness when no voltage is applied to the reflective LCD 8, that is, in the dark state, a rotational angle and thickness H2 of the second phase difference compensating plate 22 is obtained.

FIG. 10 is a graph exhibiting three-dimensionally the relationship among a brightness, a rotational angle and a thickness H2, and FIG. 11 illustrates the three-dimensional graph shown in FIG. 10 in a plan view by contour lines. In FIG. 10, a rotational angle of the second phase difference compensating plate 22 is allocated in the horizontal direction, the thickness H2 is allocated in a depth direction that is perpendicular to the horizontal direction and an intensity of leaked light is allocated in the vertical direction. Each parameter of the second phase difference compensating plate 22 is the same as that exhibited in the explanation of the above-mentioned film VA-110. As mentioned above, light leakage (brightness) in the dark state is examined. Consequently, it is defined that a dark area low in brightness is excellent in characteristics.

As shown in FIGS. 10 and 11, there existed two peaks: a peak P1 is higher in brightness and another peak P2 is lower in brightness. In order to eliminate light leakage, that is, in order to increase contrast ratio, a rotational angle and a thickness of the second phase difference compensating plate 22 should be set in a shaded area shown in FIG. 11, which is a valley area around the two peaks P1 and P2. The shaded area shown in FIG. 11 that is provided with relatively wide area represents that a rotational angle of the second phase difference compensating plate 22 is easy to adjust while assembling the reflective LCD projector 20.

In this connection, the graph shown in FIG. 8 shows a state of cross section, which is cut along the horizontal direction, that is, cut along the rotational angle direction of the second phase difference compensating plate 22 at a position where the thickness H2 is 46 μm in FIG. 10. Although the rotational angle of the second phase difference compensating plate 22 is indicated up to 190 degrees in FIG. 10, positions in a prolonging direction of points A and B shown in FIG. 10 almost correspond to the points A and B in FIG. 8 respectively. In FIGS. 10 and 11, they exhibit a case that the pre-tilt angle θ2 is 85 degrees. If the pre-tilt angle θ2 is changed, locations of the peaks P1 and P2 in FIG. 10 are shifted only in the thickness H2 direction. Consequently, a total shape of rise and fall is basically not changed.

Further, a relationship between the parameter "(Nx−Ny)·H2" in the horizontal direction and brightness is shown in FIG. 12. Two curves corresponding to pre-tilt angles of 80 and 85 degrees respectively are illustrated in FIG. 12. The curves are equivalent to a cross section of a region between 130 degrees and 140 degrees of the rotational angle of the second phase difference compensating plate 22 shown in FIG. 10 with being cut along the thickness H2 direction. In FIG. 12, a minimum portion is an optimal point. However, as shown in FIG. 11, the optimal point is distributed widely in the rotational direction of the second phase difference compensating plate 22.

In the above explanation, it is defined as a condition that light is incident perpendicularly into the second phase difference compensating plate 22 and emerges perpendicularly from the second phase difference compensating plate 22. However, light is actually incident into the second phase difference compensating plate 22 from a diagonal direction inclined by a certain angle from the vertical direction. Therefore, as mentioned above, the value of refractive index Nz in the depth direction of the second phase difference compensating plate 22 becomes an important factor as the parameter "(Nx−Nz)·H2" in the vertical direction.

The parameter "(Nx−Nz)·H2" affects a characteristic of viewing angle characteristic.

FIG. 13 is an exemplary graph showing a state of light leakage that happens with depending upon a direction of incident light when the light is incident into the reflective LCD in the dark state, wherein a pre-tilt angle θ2 of liquid crystal is 80 degrees. In this case, a condition of the second phase difference compensating plate 22 is the same as the case of using the film VA-110 mentioned above. As shown in FIG. 13, a shaded area in which a black level is practical level is extremely narrow.

Further, the pre-tilt angle of 80 degrees makes the parameter "(Nx−Nz)·H2" in the vertical direction change and the characteristic of viewing angle characteristic is apt to be worst. FIG. 14 is a graph showing a cross section, which is cut along an arrow direction shown in FIG. 13 in the azimuth angle from 225 degrees to 45 degrees.

In FIG. 14, the horizontal axis shows a tilt angle of incident light, wherein the vertical direction is defined as zero degree, and the graph is illustrated by various thicknesses H2 of the second phase difference compensating plate 22 from zero to 200 µm as a parameter.

As it is apparent from FIG. 14, increasing the thickness H2 of the second phase difference compensating plate 22 from zero to 80 µm, actually, increasing the parameter "(Nx−Nz)·H2" in the depth direction from zero to 80 µm reduces light leakage and results in improving black level excellently.

Further, it is confirmed that a black level expands to a tilted direction of incident light in a wide area excellently. However, in a case that the thickness H2 exceeds 80 µm and becomes too thick (from 140 µm to 200 µm), it is confirmed that light leakage increases and the black level is deteriorated.

Accordingly, an area in which a black level becomes an optimal value can be obtained in a relatively wide range and the second phase difference compensating plate 22 can be adjusted easily if the thickness H2 is not more than 80 µm.

[Third Embodiment]

In the above-mentioned second embodiment, the thickness H2 of the second phase difference compensating plate 22 is not particularly specified in relation to a wavelength (λ) of incident light. On the contrary, in this third embodiment, by setting a thickness of phase difference compensating plate such that a phase difference generated in the phase difference compensating plate is more than another phase difference generated in a reflective liquid crystal element and not more than λ/4, wherein a wavelength of incident light is defined as λ, a bright projected picture image can be obtained even though a pre-tilt angle of liquid crystal becomes smaller as well as displaying the picture image high in contrast ratio.

Figure 15:
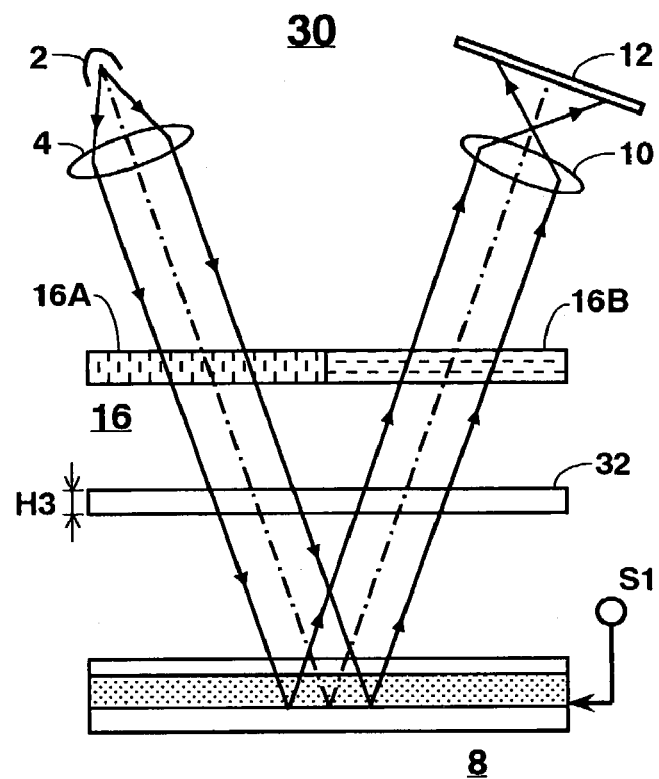
FIG. 15 is a third basic configuration of a reflective liquid crystal projection apparatus according to a third embodiment of the present invention.

FIG. 15 is a third basic configuration of a reflective liquid crystal projection apparatus according to a third embodiment of the present invention.

Figure 16:
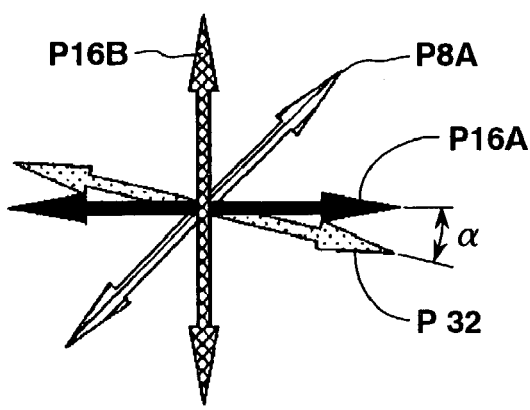
FIG. 16 shows a polarization direction of each plate of polarizing plates for incident light and reflected light and a phase difference compensating plate shown in FIG. 15.

FIG. 16 shows a polarization direction of each plate of polarizing plates for incident light and reflected light and a phase difference compensating plate shown in FIG. 15.

Figure 17:
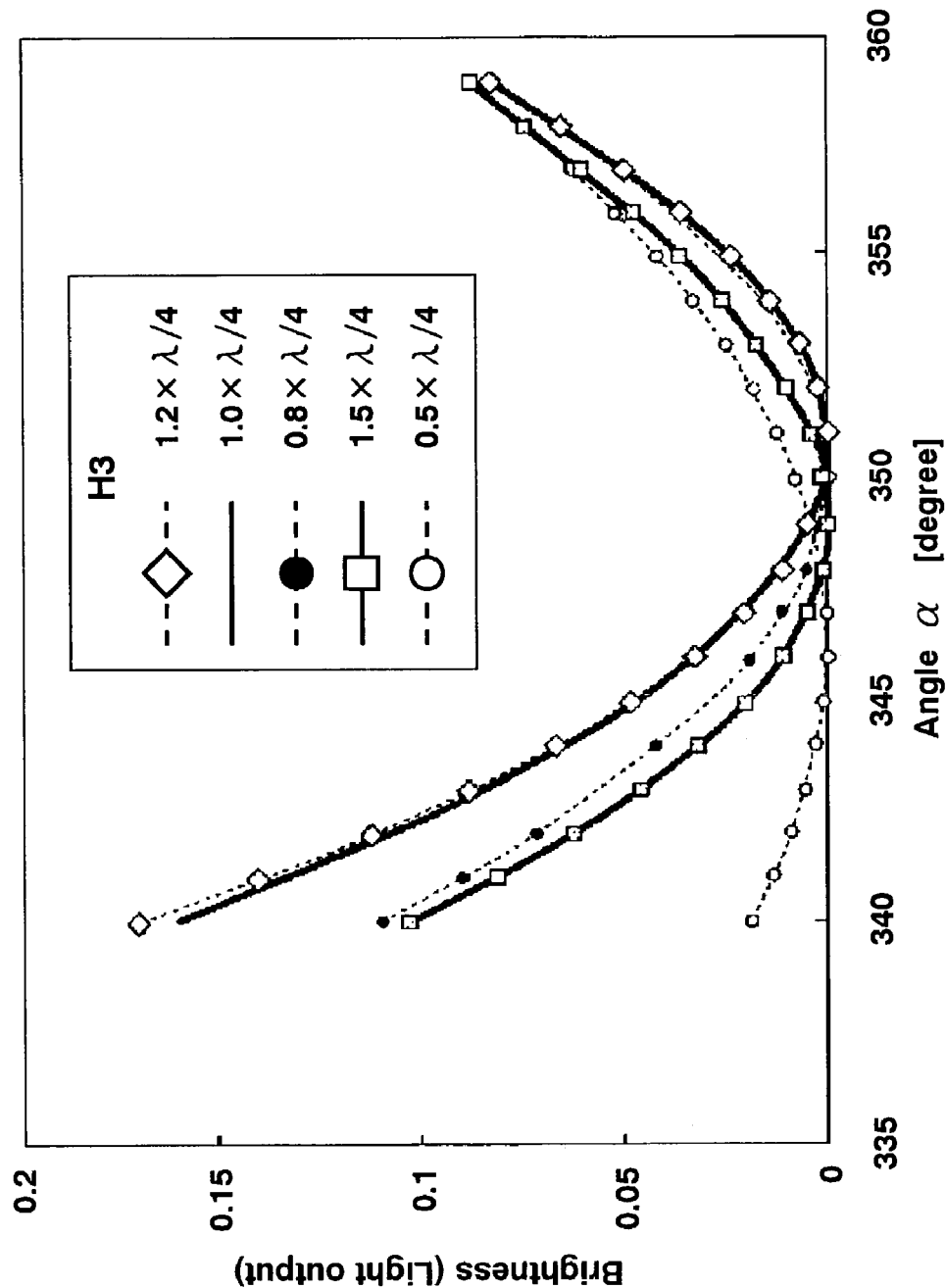
FIG. 17 is a graph showing a change of black level when changing an angle $\alpha$ shown in FIG. 16 and a plate thickness H3 of the phase difference compensating plate 32 shown in FIG. 15.

FIG. 17 is a graph showing a change of black level when changing an angle α shown in FIG. 16 and a plate thickness H3 of the phase difference compensating plate 32 shown in FIG. 15.

Figure 18:
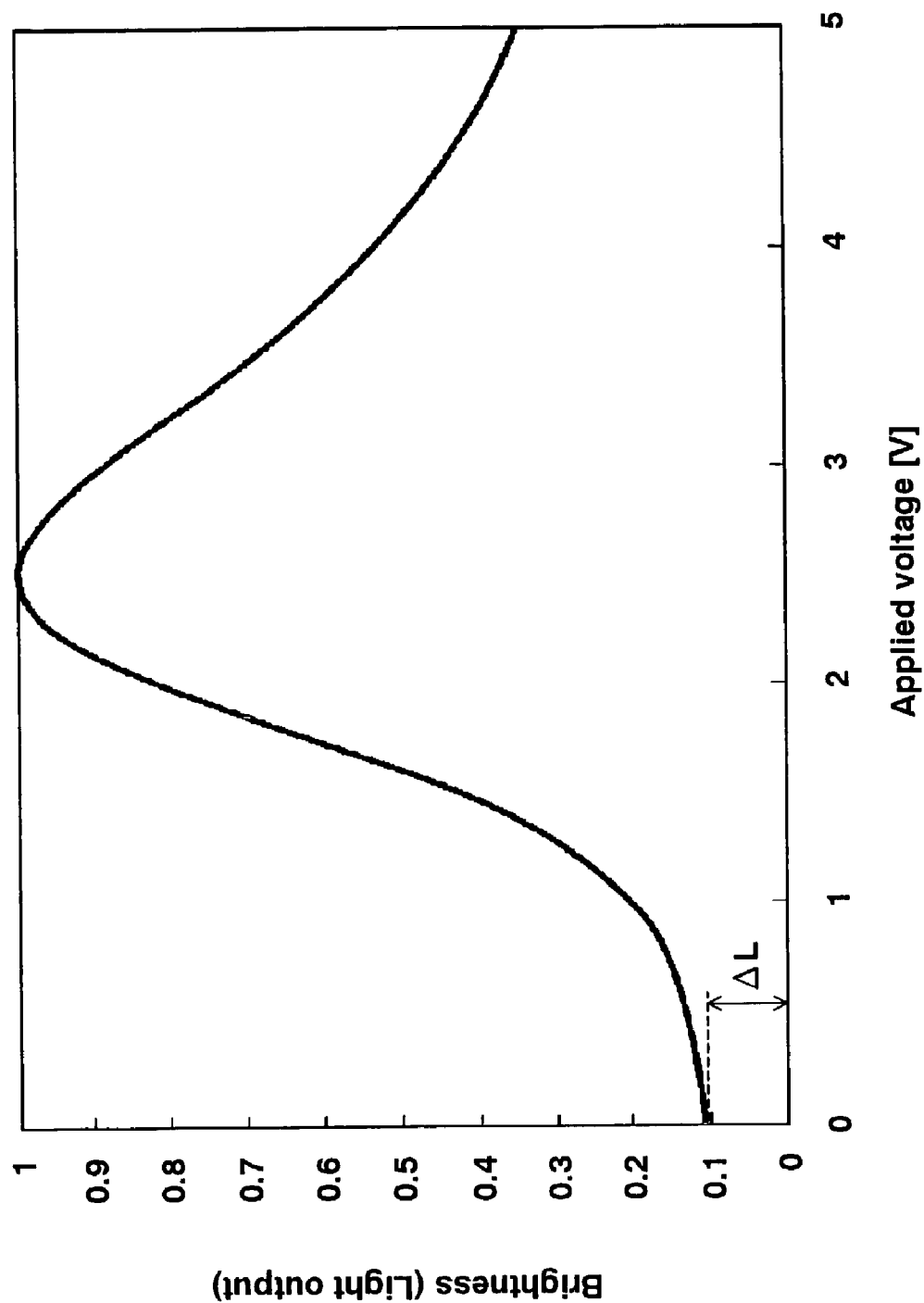
FIG. 18 is a graph showing a relationship between brightness and an applied voltage across the reflective liquid crystal element 8 shown in FIG. 15 when the phase difference compensating plate 32 is excluded.

FIG. 18 is a graph showing a relationship between brightness and an applied voltage across the reflective liquid crystal element 8 shown in FIG. 15 when the phase difference compensating plate 32 is excluded.

FIG. 19 (a) is a graph showing a relationship between brightness and an applied voltage across the reflective liquid crystal element 8 shown in FIG. 15 when a phase difference in the phase difference compensating plate 32 is 1×λ/4.

Figure 19A:
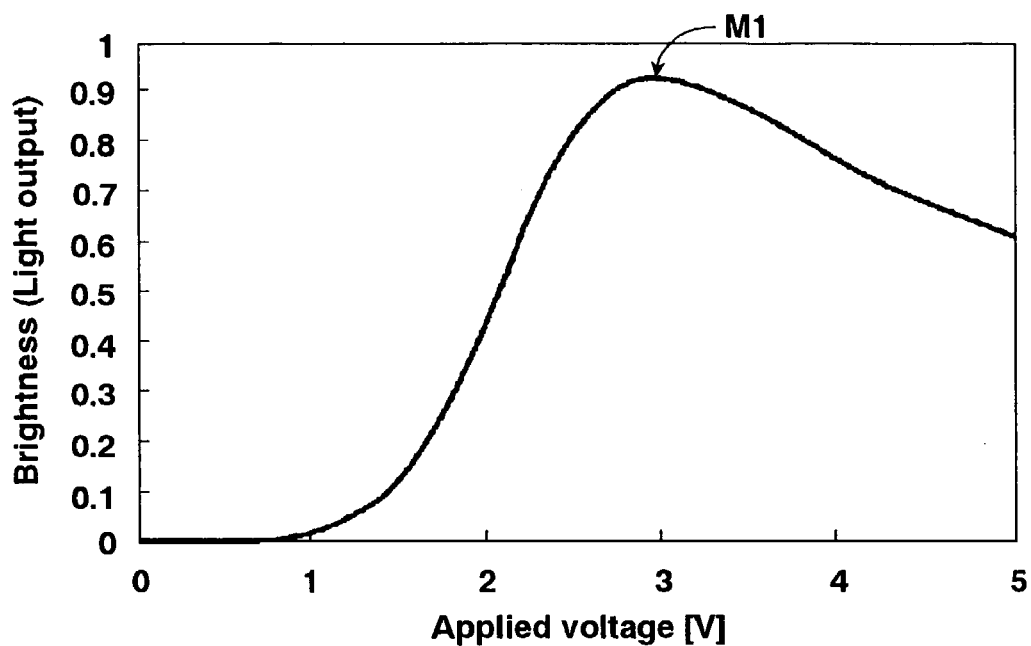
FIG. 19(a) is a graph showing a relationship between brightness and an applied voltage across the reflective liquid crystal element 8 shown in FIG. 15 when a phase difference in the phase difference compensating plate 32 is $1 \times \lambda/4$.
Figure 19B:
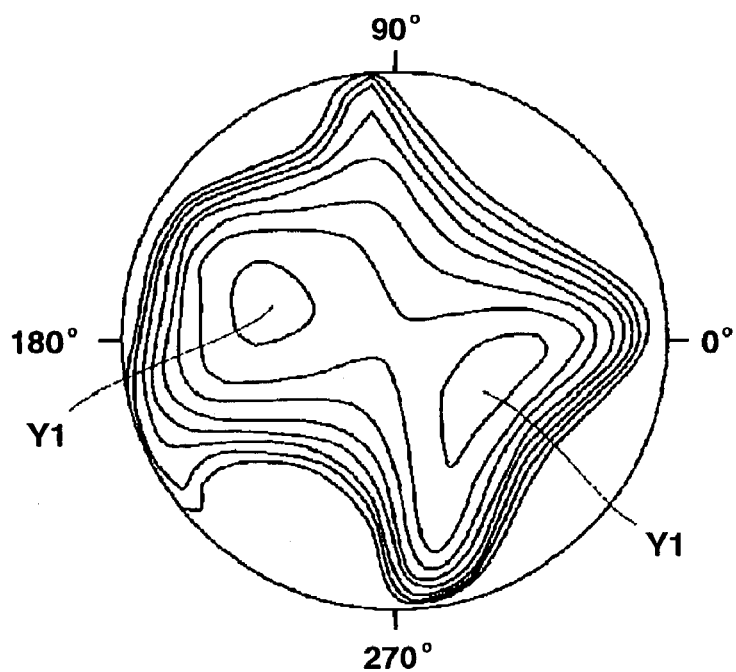
FIG. 19(b) is a graph showing a viewing angle characteristic corresponding to the relationship shown in FIG. 19(a).

FIG. 19(b) is a graph showing a viewing angle characteristic corresponding to the relationship shown in FIG. 19(a).

FIG. 20 (a) is a graph showing a relationship between brightness and an applied voltage across the reflective liquid crystal element 8 shown in FIG. 15 when a phase difference in the phase difference compensating plate 32 is 1.5×λ/4.

Figure 20A:
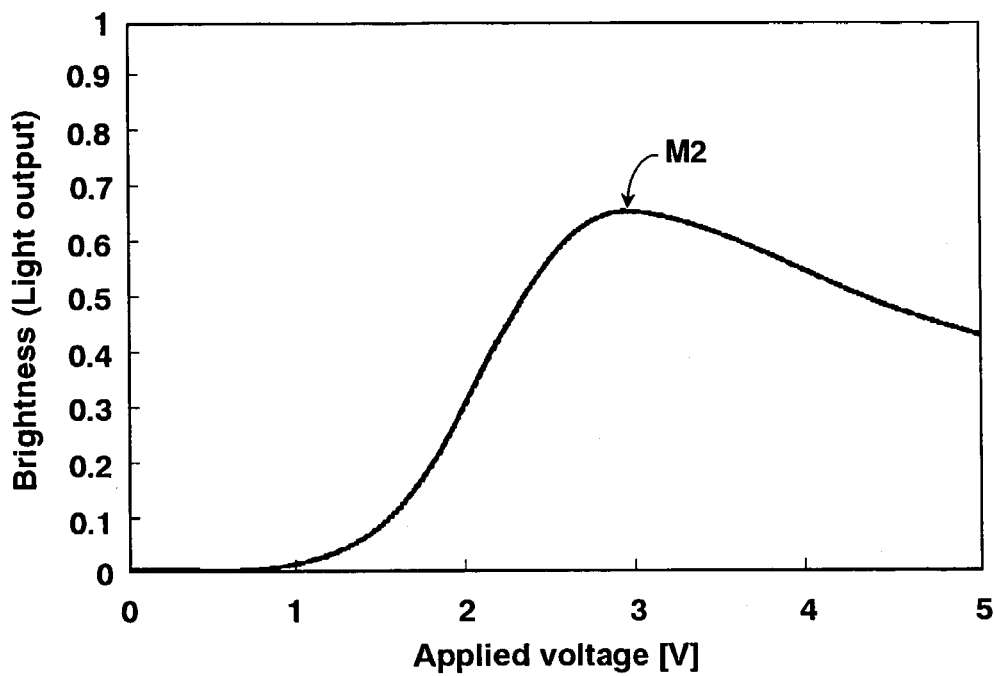
FIG. 20(a) is a graph showing a relationship between brightness and an applied voltage applied across the reflective liquid crystal element 8 shown in FIG. 15 when a phase difference in the phase difference compensating plate 32 is $1.5 \times \lambda/4$.
Figure 20B:
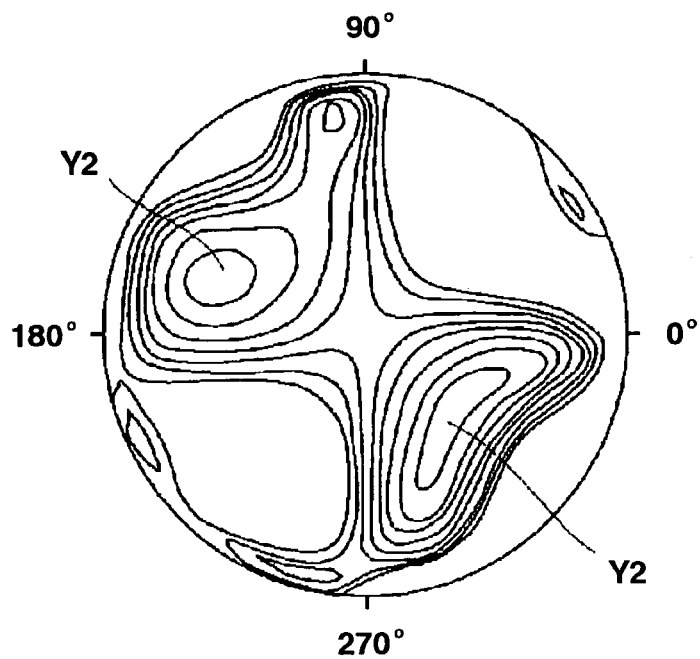
FIG. 20(b) is a graph showing a viewing angle characteristic corresponding to the relationship shown in FIG. 20(a).

FIG. 20(b) is a graph showing a viewing angle characteristic corresponding to the relationship shown in FIG. 20(a).

FIG. 21 (a) is a graph showing a relationship between brightness and an applied voltage across the reflective liquid crystal element 8 shown in FIG. 15 when a phase difference in the phase difference compensating plate 32 is 0.5×λ/4, 1×λ/4 and 1.5·λ/4 respectively.

Figure 21A:
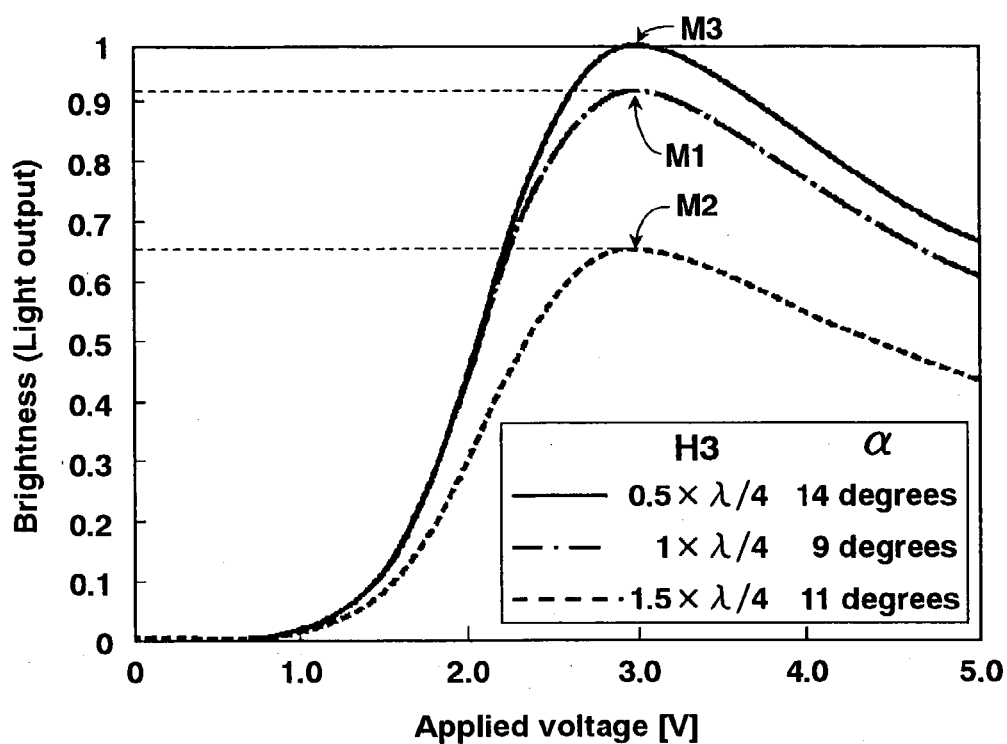
FIG. 21(a) is a graph showing a relationship between brightness and an applied voltage across the reflective liquid crystal element 8 shown in FIG. 15 when a phase difference in the phase difference compensating plate 32 is $0.5 \times \lambda/4$, $1 \times \lambda/4$ and $1.5 \times \lambda/4$ respectively.
Figure 21B:
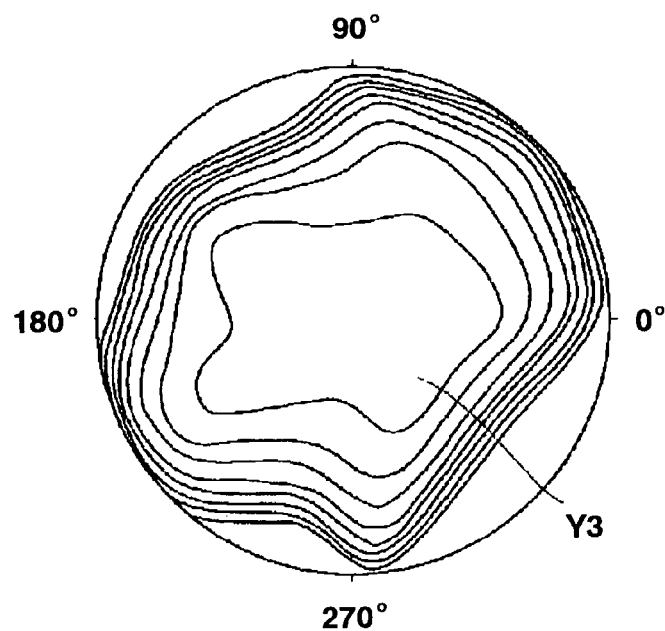
FIG. 21(b) is a graph showing a viewing angle characteristic when a phase difference in the phase difference compensating plate 32 is $0.5 \times \lambda/4$.

FIG. 21(b) is a graph showing a viewing angle characteristic when a phase difference in the phase difference compensating plate 32 is 0.5×λ/4.

As shown in FIG. 15, a reflective liquid crystal projection apparatus 30 (hereinafter referred to as reflective LCD projector 30) according to the third embodiment is identical to the reflective LCD projector 20 shown in FIG. 6 except for a third phase difference compensating plate 32. Therefore, details of the same components, functions and operations are omitted. In FIG. 15, the reflective LCD projector 30 is provided with the third phase difference compensating plate 32 between the reflective LCD 8 and the polarizing plate 16, wherein the polarizing plate 16 is further composed of the polarizing plate 16A for incident light and the other polarizing plate 16B for reflected light. The third phase difference compensating plate 32 shifts the linear polarization, which is applied to incident light passing through the polarizing plate 16A, to the circular polarization or the elliptical polarization. A thickness H3 of the third phase difference compensating plate 32 is set to be such that a phase difference generated in the third phase difference compensating plate 32 is more than another phase difference generated in the reflective LCD 8 and not more than λ/4, wherein a wavelength of the incident light is defined as λ.

The third phase difference compensating plate 32 is rotated in the plane parallel direction so as for a black level to be excellent maximally even in this third embodiment. However, if the phase difference that is generated in the third phase difference compensating plate 32 exceeds λ/4, an optimal incident angle of light that maximizes brightness of a projected picture image changes as described in a later paragraph. Consequently, the projected picture image becomes darker. It is not preferable for the projected picture image to be dark. A projected picture image becomes darker in accordance with decreasing a pre-tilt angle of liquid crystal.

On the other hand, in a case that the phase difference generated in the third phase difference compensating plate 32 is less than λ/4, brightness of a projected picture image can be increased as well as improving a performance of displaying black state. Consequently, by adjusting the phase difference to be less than λ/4, a projected picture image itself is set to be brighter as well as displaying the picture image high in contrast ratio although a pre-tilt angle of liquid crystal becomes small.

A direction of each optical axis of the polarizing plates 16A and 16B and the third phase difference compensating plate 32 is shown in FIG. 16. In FIG. 16, arrows P16A, P16B, P32 and P8A are a polarization direction of the polarizing plate 16A, a polarization direction of the polarizing plate 16B, a polarization direction of the third phase difference compensating plate 32 and an orientation angle of liquid crystal respectively. As shown in FIG. 16, an optical axis of the third phase difference compensating plate 32 is rotated by an angle α with respect to a light transmitting axis of the polarizing plate 16A. The angle α corresponds to the point "D" shown in FIG. 8.

FIG. 17 shows a change of brightness of black level when the angle a and the thickness H3 of the third phase difference compensating plate 32 is changed and no voltage is applied across liquid crystal, wherein a pre-tilt angle θ2 of the liquid crystal is 70 degrees. In FIG. 17, the thickness H3 is defined as a phase difference that is generated in the third phase difference compensating plate 32 and a phase difference compensating plate having a thickness equivalent to λ/4 is defined as a reference plate. As shown in FIG. 17, the thickness H3 is changed within a range from 0.5 to 1.5 times λ/4. As it is apparent from the graph shown in FIG. 17, by adjusting the angle α of the third phase difference compensating plate 32, a black level can be adjusted for the minimum level.

A relationship between an applied voltage across the reflective LCD 8 and brightness, and a viewing angle characteristic is studied with respect to particular cases of the thickness H3 of the third phase difference compensating plate 32. The particular cases are as follows: a first case is that the thickness H3 is zero, (that is, no third phase difference compensating plate 32 is provided), with defining that the thickness H3 is a phase difference generated in the third phase difference compensating plate 32, a second case is that the thickness H3 is λ/4(1×λ/4), a third case is that the thickness H3 is 1.5 times the second case (1.5×λ/4), a fourth case is that the thickness H3 is half the second case (0.5×λ/4), wherein a viewing angle characteristic is not provided for the first case.

FIG. 18 shows a relationship between a supplied voltage across the reflective LCD 8 and brightness while a pre-tilt angle θ2 of liquid crystal is 70 degrees and the third phase difference compensating plate 32 is not provided (the first case). In this first case, a certain intensity of brightness ΔL leaks even though the applied voltage is zero, and no contrast is obtained at all. Consequently, characteristic-wise the first case is not desirable.

FIG. 19(a) is a graph showing a relationship between an applied voltage across the reflective LCD 8 and brightness when the thickness H3 is set such that a phase difference generated in the third phase difference compensating plate 32 becomes 1×λ/4, wherein the angle α is 9 degrees (the second case). FIG. 19(b) is a graph of the second case showing a viewing angle characteristic.

As shown in FIG. 19(a), the light leakage ΔL shown in FIG. 18 is not existed in this second case even when the applied voltage is zero, and excellent contrast ratio can be obtained. However, a peak value of brightness shown by a peak M1 is the order of 0.92 and brightness is lowered. The reason why the brightness is lowered is exhibited in the viewing angle characteristic shown in FIG. 19(b) (that shows the characteristic when a voltage, which drives liquid crystal so as to brighten the center of the reflective LCD 8 maximally, is applied). As shown in FIG. 19(b), a most brightening part Y1 is shifted from the center to the right and left directions. On the contrary, brightness of the center part is reduced. In addition thereto, the viewing angle characteristic shown in FIG. 19(b) is exhibited by contour lines of brightness. Exhibiting brightness by contour lines is the same situation as for the third and fourth cases.

FIG. 20(a) is a graph showing a relationship between an applied voltage across the reflective LCD 8 and brightness when the thickness H3 is set such that a phase difference generated in the third phase difference compensating plate 32 becomes 1.5×λ/4, wherein the angle α is 11 degrees (the third case). FIG. 20(b) is a graph of the third case showing a viewing angle characteristic when brightness of the center part is maximum.

As shown in FIG. 20(a), the light leakage ΔL shown in FIG. 18 does not exist in this third case even when the applied voltage is zero, and excellent contrast ratio can be obtained. However, a peak value of brightness shown by a peak M2 is the order of 0.65, and brightness is deteriorated extremely. The reason why the brightness is deteriorated is exhibited in the viewing angle characteristic shown in FIG. 20(b) (that shows the characteristic when a voltage, which drives liquid crystal so as to brighten the center of the reflective LCD 8 maximally, is applied). As shown in FIG. 20(b), a most brightening part Y2 is shifted from the center to the right and left directions furthermore in comparison with the most brightening part Y1 shown in FIG. 19(b), and brightness of the center part is drastically reduced.

FIG. 21(a) is a graph showing a relationship between an applied voltage across the reflective LCD 8 and brightness when the thickness H3 is set such that a phase difference generated in the third phase difference compensating plate 32 becomes 0.5×λ/4, wherein the angle α is 14 degrees (the fourth case). FIG. 21(b) is a graph of the fourth case showing a viewing angle characteristic when brightness of the center part is maximum.

Further, in FIG. 21(a), two other curves of which phase differences in the third phase difference compensating plate 32 correspond to 1×λ/4 (the second case) and 1.5×λ/4 (the third case) respectively are illustrated for the purpose of comparison.

As shown in FIG. 21(a), the light leakage ΔL shown in FIG. 18 does not exsist in this fourth case even when the applied voltage is zero, and excellent contrast ratio can be obtained.

Furthermore, in a case that the thickness H3 of the third phase difference compensating plate 32 generates a phase difference of 0.5×λ/4, a peak value of brightness in the center part shown by a peak M3 in FIG. 21(a) is the order of one approximately and the brightness is kept in the brightest condition without reducing brightness even in a case that a pre-tilt angle of liquid crystal is 70 degrees. The reason why the brightness is in the brightest condition is exhibited in the viewing angle characteristic shown in FIG. 21(b) (that shows the characteristic when a voltage, which drives liquid crystal so as to brighten the center of the reflective LCD 8 maximally, is applied). As shown in FIG. 21(b), a most brightening part Y3 is not shifted from the center to the right and left directions at all and the center part is in the brightest condition. As mentioned above, in the case that the pre-tilt angle of liquid crystal is 70 degrees, the black level can be improved and excellent contrast ratio can be obtained by rotating and adjusting the third phase difference compensating plate 32 regardless of a phase difference generated in the third phase difference compensating plate 32 even under a condition of hardly obtaining contrast ratio due to extreme light leakage while no voltage is applied across the liquid crystal. However, in the case that a phase difference generated in the third phase difference compensating plate 32 exceeds 1×λ/4, a peak value of brightness is excessively lowered, so that it is not desirable for the thickness H3.

While the invention has been described above with reference to specific embodiments thereof, it is apparent that many changes, modifications and variations in the arrangement of equipment and devices and in materials can be made without departing from the invention concept disclosed herein. For example, in these embodiments, the case of using a polarizing plate as a polarizing device is explained. However, a polarizing device is not limited to the polarizing plate. Any kind of polarizing device can be used as far as it generates polarizing effect.

As mentioned above, according to the aspect of the present invention, there is provided a reflective liquid crystal projection apparatus, which can display a projected picture image high in brightness and high in black-and-white contrast ratio.

It will be apparent to those skilled in the art that various modifications and variations could be made in the reflective liquid crystal projection apparatus in the present invention without departing from the scope or spirit of the invention.

What is claimed is:

1. A reflective liquid crystal projection apparatus comprising:
   a light source;
   a means for polarizing incident light from the light source and for emitting first polarized light;
   a reflective liquid crystal element optically modulating the first polarized light into second polarized light perpendicularly intersecting the first polarized light and reflecting the second polarized light;
   a means for polarizing reflected light reflected by the reflective liquid crystal element and for emitting the second polarized light so as to be projected onto a screen; and
   a phase difference compensating plate disposed between the reflective liquid crystal element and the means for polarizing incident light and reflected light in a light path of the light emitted from the light source,
   wherein the phase difference compensating plate converts linear polarization of the first polarized light into elliptical polarization, and a phase difference of the phase difference compensating plate is within a range of more than a phase difference generated in the reflective liquid crystal element and less than $\lambda/4$, wherein $\lambda$ is a center wavelength of the first polarized light, and
   wherein the first polarized light converted into elliptical polarization by the phase difference compensating plate is supplied to the reflective liquid crystal element, and
   wherein the second polarized light emitted from the reflective liquid crystal element enters into the phase difference compensating plate in a state of the elliptical polarization, and
   wherein an optical axis of the phase difference compensating plate is neither in parallel with nor perpendicular to a polarizing direction of both the first and second polarized light.

2. The reflective liquid crystal projection apparatus in accordance with claim 1, wherein the phase difference compensating plate has a refractive index difference, which generates a phase difference larger than another phase difference generated when displaying a black state by the reflective liquid crystal element, in a plane parallel direction.

3. The reflective liquid crystal projection apparatus in accordance with claim 1, wherein a refractive index in a thickness direction of the phase difference compensating plate is smaller than a refractive index in a plane parallel direction.

4. A reflective liquid crystal projection apparatus comprising:
   a light source;
   a reflective liquid crystal element optically modulating the first polarized light into second polarized light perpendicularly intersecting the first polarized light and reflecting the second polarized light;
   a projection lens;
   a polarizer passing the first polarized light out of light emitted from the light source and supplying the first light to the reflective liquid crystal element and emitting the second polarized light reflected by the reflective liquid crystal element to a direction of the projection lens; and
   a phase difference compensating plate disposed between the reflective liquid crystal element and the polarizer,
   wherein the phase difference compensating plate converts linear polarization of the first polarized light into elliptical polarization, and a phase difference of the phase difference compensating plate is within a range of more than a phase difference generated in the reflective liquid crystal element and less than $\lambda/4$, wherein $\lambda$ is a center wavelength of the first polarized light, and
   wherein the first polarized light converted into elliptical polarization by the phase difference compensating plate is supplied to the reflective liquid crystal element, and
   wherein the second polarized light emitted from the reflective liquid crystal element enters into the phase difference compensating plate in a state of the elliptical polarization, and
   wherein an optical axis of the phase difference compensating plate is neither in parallel with nor perpendicular to a polarizing direction of both the first and second polarized light.

5. The reflective liquid crystal projection apparatus in accordance with claim 4, wherein the phase difference compensating plate has a refractive index difference, which generates a phase difference larger than another phase difference generated when displaying a black state by the reflective liquid crystal element, in a plane parallel direction.

6. The reflective liquid crystal projection apparatus in accordance with claim 4, wherein a refractive index in a thickness direction of the phase difference compensating plate is smaller than a refractive index in a plane parallel direction.

* * * * *